United States Patent
Freitag et al.

(10) Patent No.: US 7,580,230 B2
(45) Date of Patent: Aug. 25, 2009

(54) MAGNETORESISTIVE SENSOR HAVING SHAPE ENHANCED PINNING, A FLUX GUIDE STRUCTURE AND DAMAGE FREE VIRTUAL EDGES

(75) Inventors: James Mac Freitag, Sunnyvale, CA (US); Kuok San Ho, Redwood City, CA (US); Mustafa Michael Pinarbasi, Morgan Hill, CA (US); Ching Hwa Tsang, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 456 days.

(21) Appl. No.: 11/588,013

(22) Filed: Oct. 24, 2006

(65) Prior Publication Data
US 2008/0094761 A1 Apr. 24, 2008

(51) Int. Cl.
*G11B 5/39* (2006.01)
*G11B 5/33* (2006.01)

(52) U.S. Cl. .................... 360/324.12; 360/324.11; 360/321

(58) Field of Classification Search ............. 360/321, 360/324, 324.1, 324.11, 324.12, 324.2
See application file for complete search history.

(56) References Cited

U.S. PATENT DOCUMENTS

| | | | |
|---|---|---|---|
| 5,666,248 A | 9/1997 | Gill | 360/113 |
| 5,905,611 A | 5/1999 | Yoda et al. | 360/113 |
| 5,909,344 A | 6/1999 | Gill | 360/113 |
| 5,930,084 A | 7/1999 | Dovek et al. | 360/113 |
| 6,061,211 A | 5/2000 | Yoda et al. | 360/113 |
| 6,583,970 B1 | 6/2003 | Sakata | 360/324.12 |
| 6,631,055 B2 * | 10/2003 | Childress et al. | 360/321 |
| 6,657,825 B2 * | 12/2003 | Ho et al. | 360/321 |
| 6,765,767 B2 | 7/2004 | Trindade et al. | 360/319 |
| 6,787,369 B2 * | 9/2004 | Ishii et al. | 438/3 |
| 6,847,510 B2 * | 1/2005 | Childress et al. | 360/324.2 |
| 6,873,499 B2 * | 3/2005 | Lee et al. | 360/321 |
| 7,036,208 B2 * | 5/2006 | Ho et al. | 29/603.13 |
| 7,161,773 B2 * | 1/2007 | Fontana et al. | 360/324.1 |
| 7,220,499 B2 * | 5/2007 | Saito et al. | 428/811.5 |
| 7,324,310 B2 * | 1/2008 | Gill | 360/324.11 |
| 7,346,977 B2 * | 3/2008 | Cyrille et al. | 29/603.15 |
| 7,365,949 B2 * | 4/2008 | Hayakawa et al. | 360/324.1 |

(Continued)

FOREIGN PATENT DOCUMENTS

JP 60173891 9/1985

(Continued)

*Primary Examiner*—William J Klimowicz
(74) *Attorney, Agent, or Firm*—Zilka-Kotab, PC

(57) ABSTRACT

A magnetoresistive sensor having a shape enhanced pinning and a flux guide structure. First and second hard bias layers and lead layers extend from the sides of a sensor stack. The hard bias layers and leads have a stripe height that is smaller than the stripe height of a free layer, resulting in a free layer that extends beyond the back edge of the lead and hard bias layer. This portion of the free layer that extends beyond the back edge of the leads and hard bias layers provides a back flux guide. Similarly, the sensor may have a free layer that extends beyond the front edge of the lead and hard bias layers to provide a front flux guide. The pinned layer extends significantly beyond the back edge of the free layer, providing the pinned layer with a strong shape enhanced magnetic anisotropy.

5 Claims, 43 Drawing Sheets

U.S. PATENT DOCUMENTS

| | | | | |
|---|---|---|---|---|
| 7,369,371 | B2 * | 5/2008 | Freitag et al. | 360/324.11 |
| 7,420,787 | B2 * | 9/2008 | Freitag et al. | 360/324.1 |
| 7,436,637 | B2 * | 10/2008 | Pinarbasi | 360/324.11 |
| 2001/0036045 | A1 | 11/2001 | Kondo | 360/322 |
| 2002/0051328 | A1 | 5/2002 | Hasegawa | 360/322 |
| 2003/0035249 | A1 * | 2/2003 | Ho et al. | 360/321 |
| 2004/0052005 | A1 | 3/2004 | Zolla et al. | 360/322 |
| 2004/0106295 | A1 | 6/2004 | Cyrille et al. | 438/692 |
| 2004/0109263 | A1 | 6/2004 | Suda et al. | 360/322 |
| 2004/0179307 | A1 | 9/2004 | Burbank et al. | 360/313 |
| 2004/0207960 | A1 * | 10/2004 | Saito et al. | 360/324.1 |
| 2004/0257713 | A1 | 12/2004 | Pinarbasi | 360/322 |
| 2007/0127167 | A1 * | 6/2007 | Freitag et al. | 360/324.11 |
| 2007/0206333 | A1 * | 9/2007 | Watanabe et al. | 360/313 |
| 2007/0230066 | A1 * | 10/2007 | Gill | 360/324.1 |
| 2007/0242394 | A1 * | 10/2007 | Gill | 360/324.1 |
| 2008/0055794 | A1 * | 3/2008 | Freitag et al. | 360/324.12 |
| 2008/0180863 | A1 * | 7/2008 | Gill | 360/324.2 |
| 2009/0021870 | A1 * | 1/2009 | Pinarbasi | 360/324.11 |

FOREIGN PATENT DOCUMENTS

| | | | |
|---|---|---|---|
| JP | 7121839 | | 5/1995 |
| JP | 10302230 | | 11/1998 |
| JP | 2000132815 | | 5/2000 |
| JP | 2001266313 A | * | 9/2001 |
| JP | 2003036509 | | 2/2003 |
| JP | 2003059016 | | 2/2003 |

* cited by examiner

MAGNETORESISTIVE SENSOR HAVING SHAPE ENHANCED PINNING, A FLUX GUIDE STRUCTURE AND DAMAGE FREE VIRTUAL EDGES

FIELD OF THE INVENTION

The present invention relates to the construction of magnetoresistive sensors, and more particularly to the construction of a magnetoresistive sensor having a pinned layer with a shape induced magnetic anisotropy, damage free virtual edges and a flux guide structure, all of which provide improved magnetic performance.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating but, when the disk rotates, air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic impressions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to cos θ, where θ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

When a spin valve sensor employs a single pinned layer it is referred to as a simple spin valve. When a spin valve employs an antiparallel (AP) pinned layer it is referred to as an AP pinned spin valve. An AP pinned spin valve includes first and second magnetic layers separated by a thin nonmagnetic coupling layer such as Ru. The thickness of the spacer layer is chosen so as to antiparallel couple the magnetizations of the ferromagnetic layers of the pinned layer. A spin valve is also known as a top or bottom spin valve depending upon whether the pinning layer is at the top (formed after the free layer) or at the bottom (before the free layer).

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

Magnetization of the pinned layer is usually fixed by exchange coupling one of the ferromagnetic layers (AP1) with a layer of antiferromagnetic material such as PtMn. While an antiferromagnetic (AFM) material such as PtMn does not in and of itself have a magnetization, when exchange coupled with a magnetic material, it can strongly pin the magnetization of the ferromagnetic layer.

The push for ever increased data rate and data capacity has lead a drive to make magnetoresistive sensors ever smaller. For example, designing a sensor with a narrower track width means that more tracks of data can be fit onto a given area of magnetic medium. The various dimensions of a sensor must scale together, so if the trackwidth is decreased, then the stripe height dimension (perpendicular to the ABS) must also be decreased. As sensors become ever smaller, one problem that arises is that the pinned layer becomes impracticably unstable. In fact, future generation sensors will very soon become so small that the pinned layer cannot be adequately pinned by current pinning mechanisms. This has to do with the size of the pinned layer, which makes the pinned layer itself hard to pin, as well as the reduced area on which traditional pinning mechanisms such as AFM pinning, AP coupling, and magnetostriction induced anisotropy can act.

It is known that shape can induce magnetic anisotropy in magnetic materials, which can improve the stability of the pinning. Such shape induced anisotropy could be provided by, for example, extending the pinned layer in the stripe height direction (perpendicular to the ABS) so that the pinned layer structure has a narrow deep rectangular structure.

However, such designs have been prevented by such factors as: the limitations on the stripe height dimension of the free layer (to avoid shape induced anisotropy in the wrong direction on the free layer); the need to avoid shunting of sense current across the extended portion of the pinned layer, and also by currently available photolithographic techniques, such as the alignment of multiple mask structures.

Damage to the edge portions of the sensor layers presents another problem to the construction of very small sensors. The manufacturing processes used to construct sensors (such as ion milling used to define the width of the sensor) cause damage to the edge portions of the sensor layers. In a larger sensor, this damaged portion at the edges comprises an acceptably small percentage of the overall sensor. However, as the sensor becomes smaller this damage portion makes up an unacceptably large proportion of the overall sensor, resulting in serious loss of sensor performance.

There is also a desire to increase the sensitivity of such a sensor. For example, increasing the responsiveness of the free layer (ie. the ability of the magnetization of the free layer to rotate in response to a magnetic field) increases the overall sensitivity (dr/R) of the sensor.

Therefore, there is a need for a manufacturable sensor design that can provide a stable pinned layer in a very small sensor. There is also a need for a sensor design that can prevent edge damage from adversely affecting performance, and that can provide increased free layer responsiveness.

SUMMARY OF THE INVENTION

The present invention provides a magnetoresistive sensor having shape enhanced pinning and a flux guide structure. The sensor includes a sensor stack with a free layer, a pinned layer and a non-magnetic, electrically conductive spacer layer sandwiched between the free layer and the pinned layer. The pinned layer has a stripe height that extends beyond the stripe height (back edge) of the free layer, resulting in a shape enhanced magnetic anisotropy that assists pinning. A hard bias structure and lead structure formed over the hard bias structure share a common back edge. The back edge of the free layer extends beyond this common back edge of the hard bias/lead layers, resulting in a back flux guide.

The front edge of the free layer may extend beyond the front edge of the hard bias and lead structures, resulting in a front flux guide. For example, the free layer can extend to the air bearing surface, while the front edge of the lead/hard bias layers are recessed from the ABS.

The pinned layer can extend to a stripe height distance (SH1) that is twice the stripe height distance (SH2) of the free layer or greater as measured from the ABS.

The flux guide structures advantageously improves sensor performance by increasing the magnetic responsiveness of the free layer to a magnetic field.

The sensor may have a lead overlay structure that moves the outer edges of the sensor layers outside of the effective trackwidth of the sensor. This advantageously moves the potentially damaged outer edges of the sensor layers outside of the track width and outside of the active area of the sensor.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
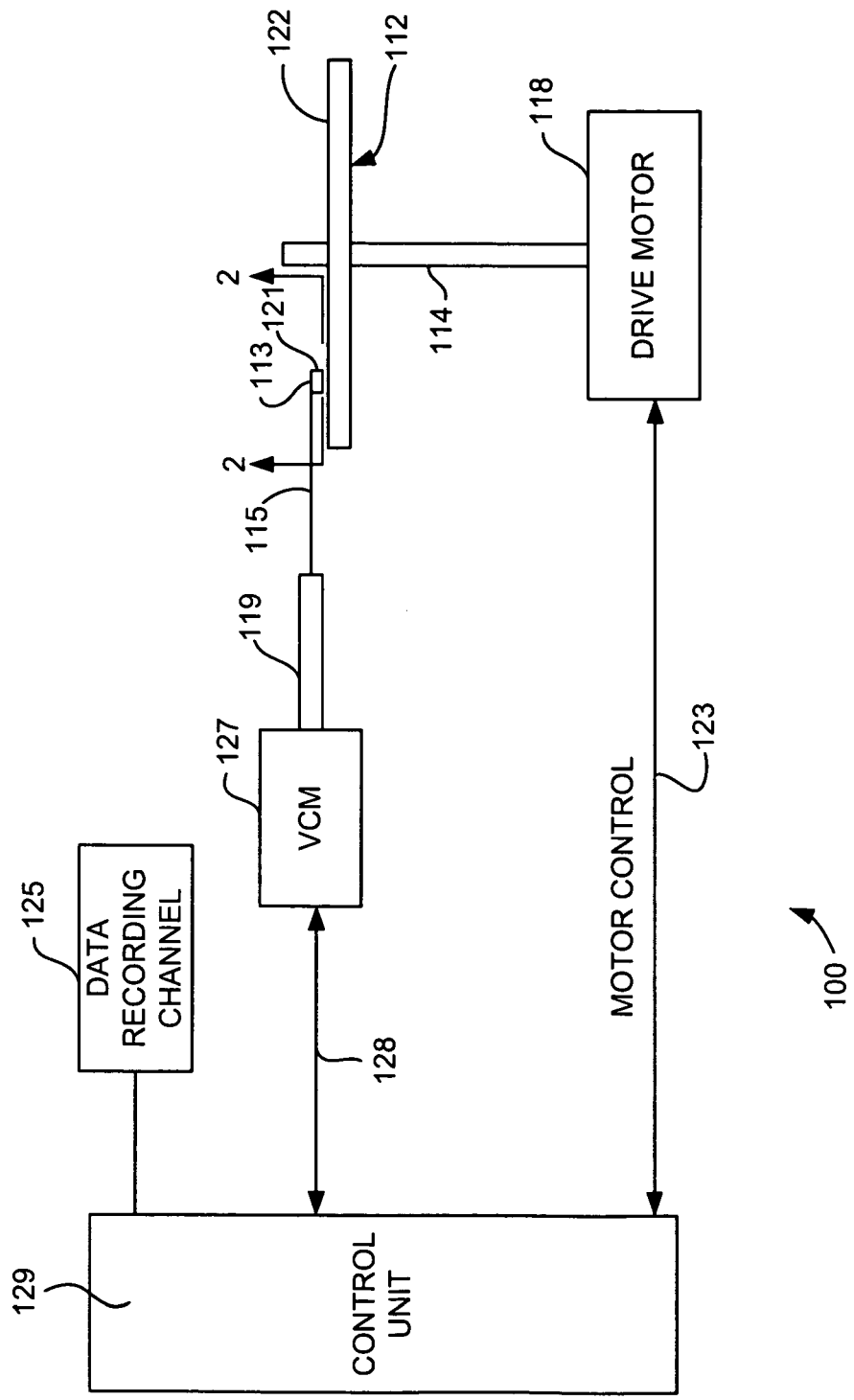
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
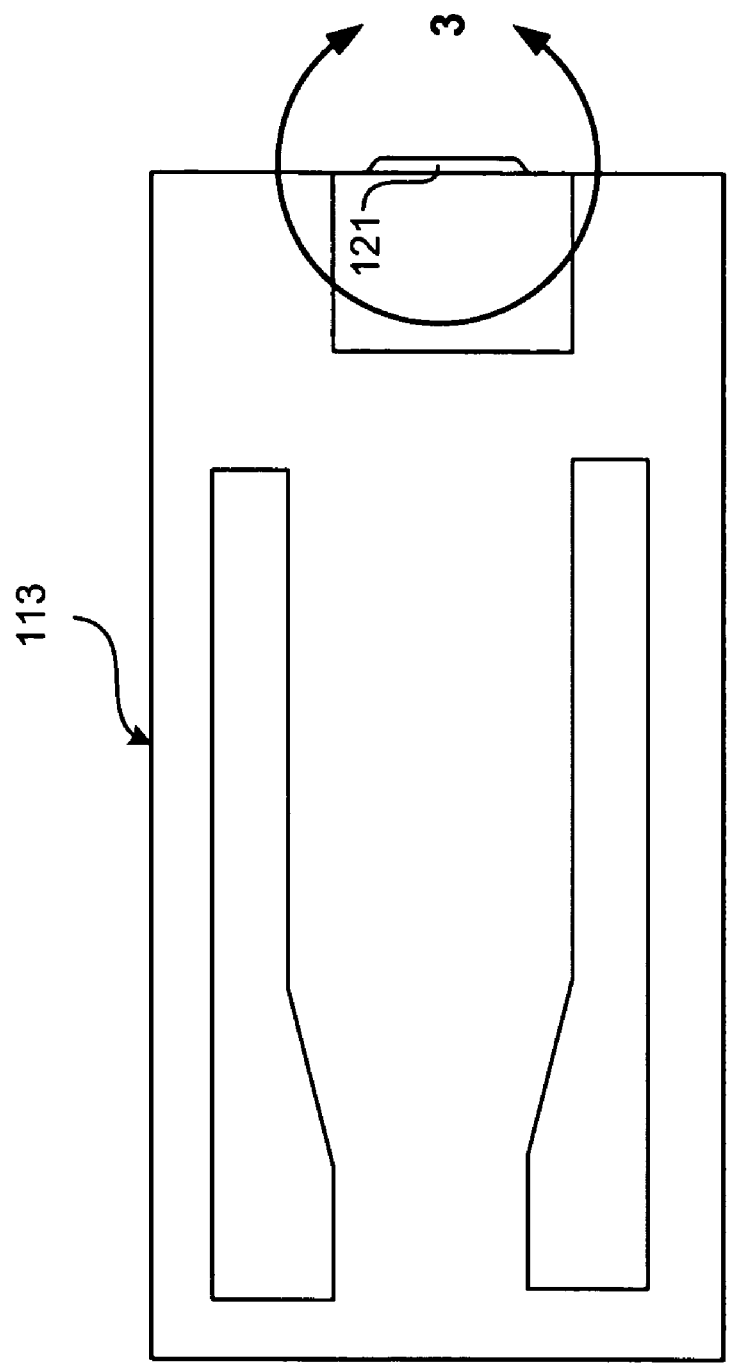
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
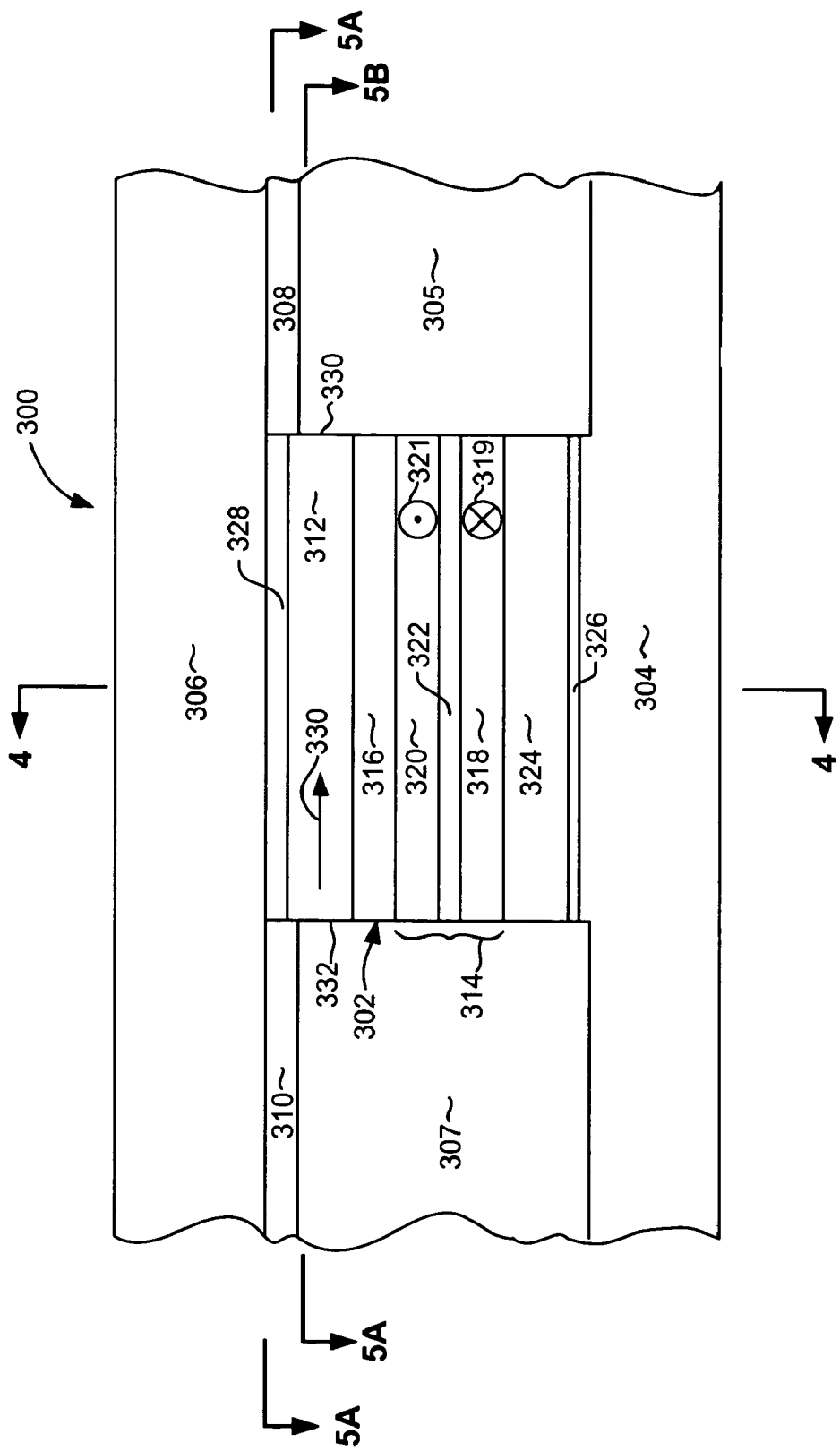
FIG. 3 is an ABS view, taken from circle 3 of FIG. 2 illustrating a sensor according to an embodiment of the invention.

With reference now to FIG. 3, a magnetoresistive sensor 300 according to an embodiment of the invention includes a magnetoresistive sensor element or sensor stack 302, sandwiched between first and second non-magnetic, electrically insulating gap layers 304, 306, which can be constructed of, for example alumina ($Al_2O_3$). First and second hard bias layers (HB) 305, 307 constructed of, for example, CoPtCr are formed at either side of the sensor to provide a magnetic bias field to bias the magnetic moment of the free layer in a direction parallel with the ABS. First and second electrically conductive lead layers 308, 310 are formed over the first and second HB layers, and extend laterally from the sides of the sensor stack 302 between the first and second gap layers 304, 306.

The sensor stack 302 includes a magnetic free layer 312, a pinned layer structure 314 and a non-magnetic, electrically conductive spacer layer 316, constructed of, for example Cu. The free layer can be constructed of several magnetic materials such as Co or CoFe, or of a combination of layers of different magnetic materials.

The pinned layer structure 314 may be a simple pinned structure or an antiparallel pinned (AP pinned) structure, and may be either self pinned or AFM pinned. For purposes of illustration, the pinned layer structure 314, will be described as an AFM pinned, AP pinned layer structure having first and second ferromagnetic layers 318, 320, which are antiparallel coupled across a non-magnetic, electrically conductive AP coupling layer 322 such as Ru. The first and second magnetic layers 318, 320 can be constructed of, for example CoFe, NiFe or some combination of these or other materials. A layer of antiferromagnetic material (AFM layer) 324 is disposed beneath the pinned layer structure 314, and can be for example PtMn, IrMn or some other antiferromagnetic material. The AFM layer 324 is exchange coupled with the first magnetic layer 318 and strongly pins the magnetic moments of the magnetic layers as indicated by symbols 319, 321.

The sensor stack 302 also may include a seed layer 326 formed at the bottom of the sensor stack 302, which can be used to initiate a desired crystalline growth in the layers of the sensor stack 302. A capping layer 328, such as for example Ta or some other suitable material may be provided at the top of the sensor stack 302 to protect the layers of the sensor stack from damage during manufacturing processes such as annealing. The sensor stack 302 has first and second lateral sides 330, 332 that define the track width (TW) of the sensor. The free layer 312 has a magnetic moment 330 that is biased in a desired direction parallel with the ABS. Biasing of the moment 330 is achieved by a bias field provided by the first and second hard bias layers 305, 307.

Figure 4:
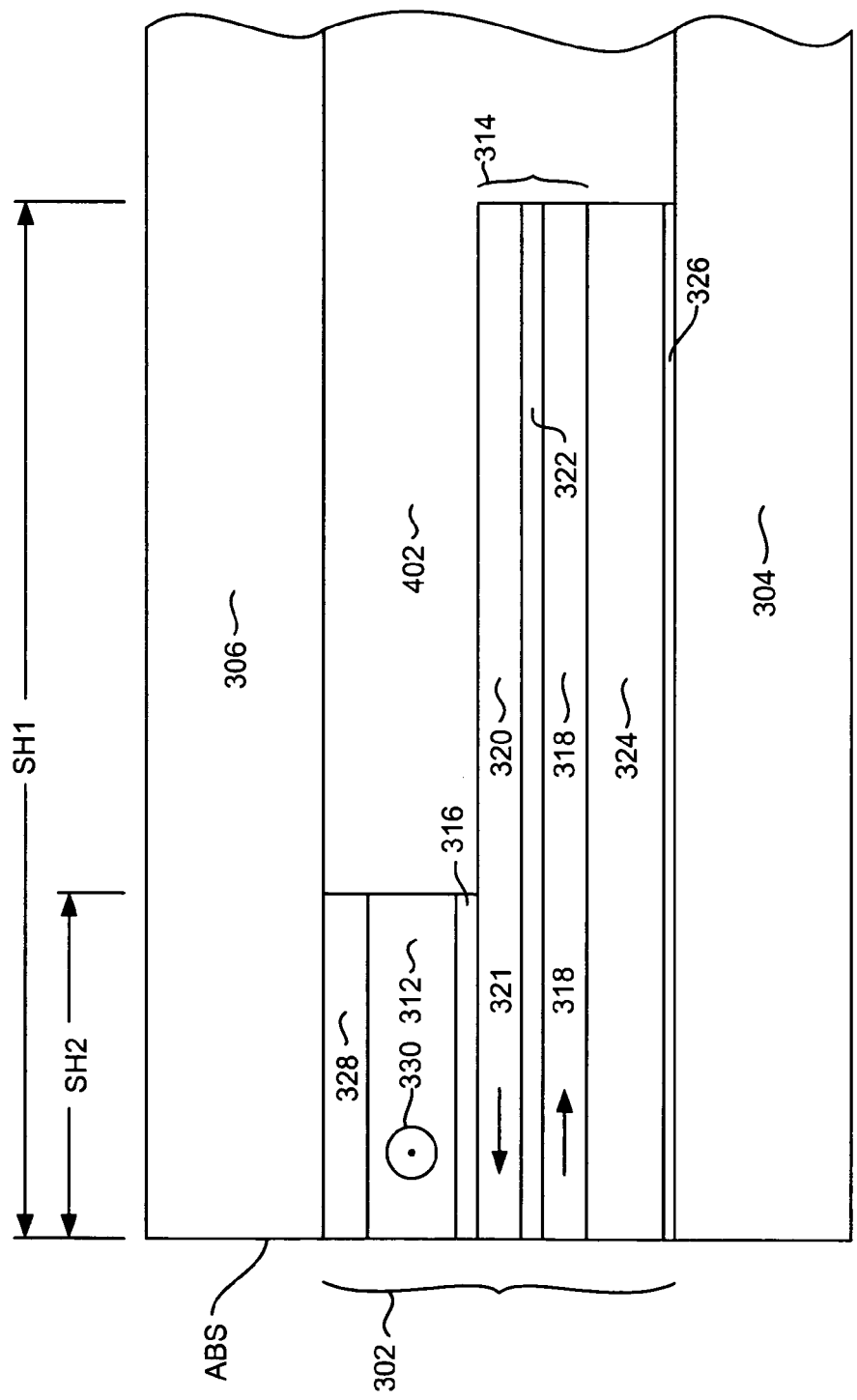
FIG. 4 is a cross sectional view taken from line 4-4 of FIG. 3.

With reference to FIG. 4, a side cross sectional view of the sensor 300 shows that the pinned layer structure 314 and AFM layer 324 extend to an extended first stripe height distance SH1 as measured from the ABS, whereas the free layer 312 and capping layer 328 extend to a shorter stripe height distance SH2 as measured from the ABS. All or a portion of the spacer layer 316 may extend to the first, longer stripe height distance SH1 or may terminate at the shorter stripe height distance SH2. The extended stripe height of the pinned layer structure 314 produces a shape enhanced magnetic anisotropy in a desired direction perpendicular to the ABS. This shape enhanced magnetic anisotropy greatly increases the strength of the pinning of the magnetizations 319, 321 of the pinned layer 314. A non-magnetic, electrically insulating fill layer 402 is provided behind the sensor stack 302 between the gap layers 304, 306 and between the extended portion of the pinned layer 314 and the second gap layer 306.

Figure 5A:
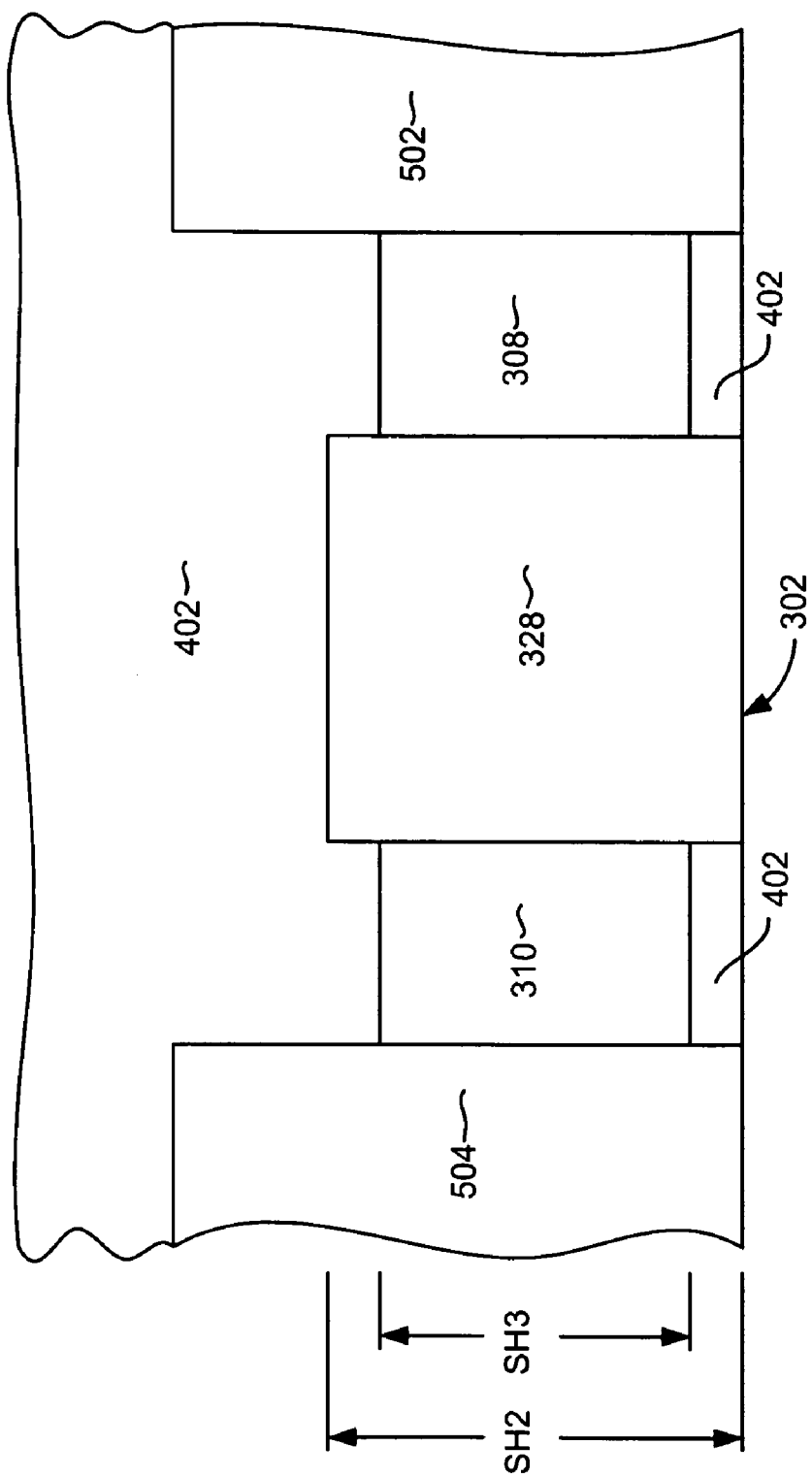
FIG. 5A is a view taken from line 5A-5A of FIG. 3.
Figure 5B:
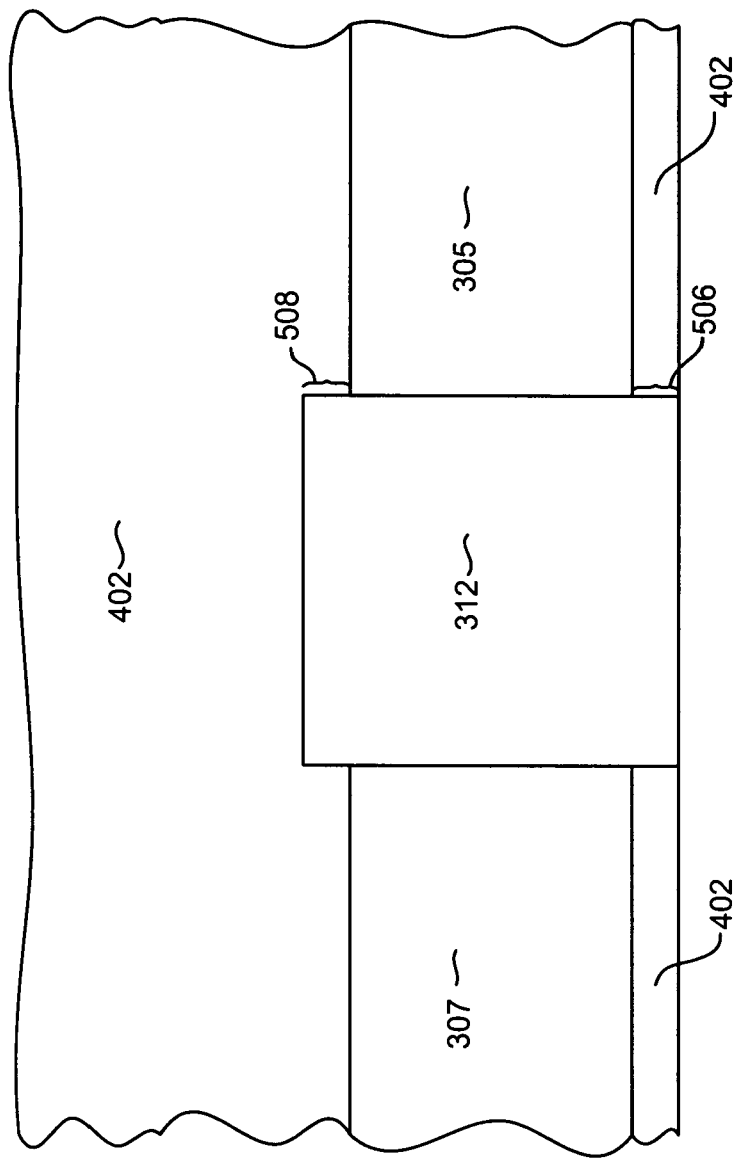
FIG. 5B is a view taken from line 5B-5B of FIG. 3.

With reference now to FIGS. 5A and 5B, it can be seen that the leads 308, 310 and hard bias layers 305, 307 have a shorter stripe height (SH3) than that (SH2) of the capping layer 328, and free layer 312. The leads 308, 310 are recessed from the ABS whereas the free layer extends to the ABS, and the capping layer 328 and free layer 312 extend beyond the back edge of the leads 308 and hard bias layers, 305, 307. This results in a sensor having an effective stripe height SH3 that is defined by the leads 308, 310 and hard bias layers 305, 307. The portion of the free layer 312 that extends from the recessed front edge of the lead and hard bias layers 308, 310, 305, 307 forms a front flux guide 506. Similarly, the portion of the free layer 412 that extends beyond the back edge of the leads and hard bias layers 308, 310, 305, 307 forms a back flux guide 508. The front and back flux guides 506, 508 increase the free layer's 312 responsiveness to magnetic fields, while the leads 308, 310 and bias layers 305, 307 provide a smaller effective stripe height SH3 needed for proper sensor performance. The space between the front edge of the ABS and the leads 308, 310 and hard bias layers 305, 307 can be filled with the non-magnetic, electrically insulating fill layer 402.

With reference to FIG. 5A, a second thicker set of leads 502, 504 may be included to increase electrical conduction to the sensor. However, these lead layers 502, 504 are not necessary to practice the invention. These second lead layers 502, 504 may be thicker than the lead layers 308, 310 and can be removed.

Figure 6:
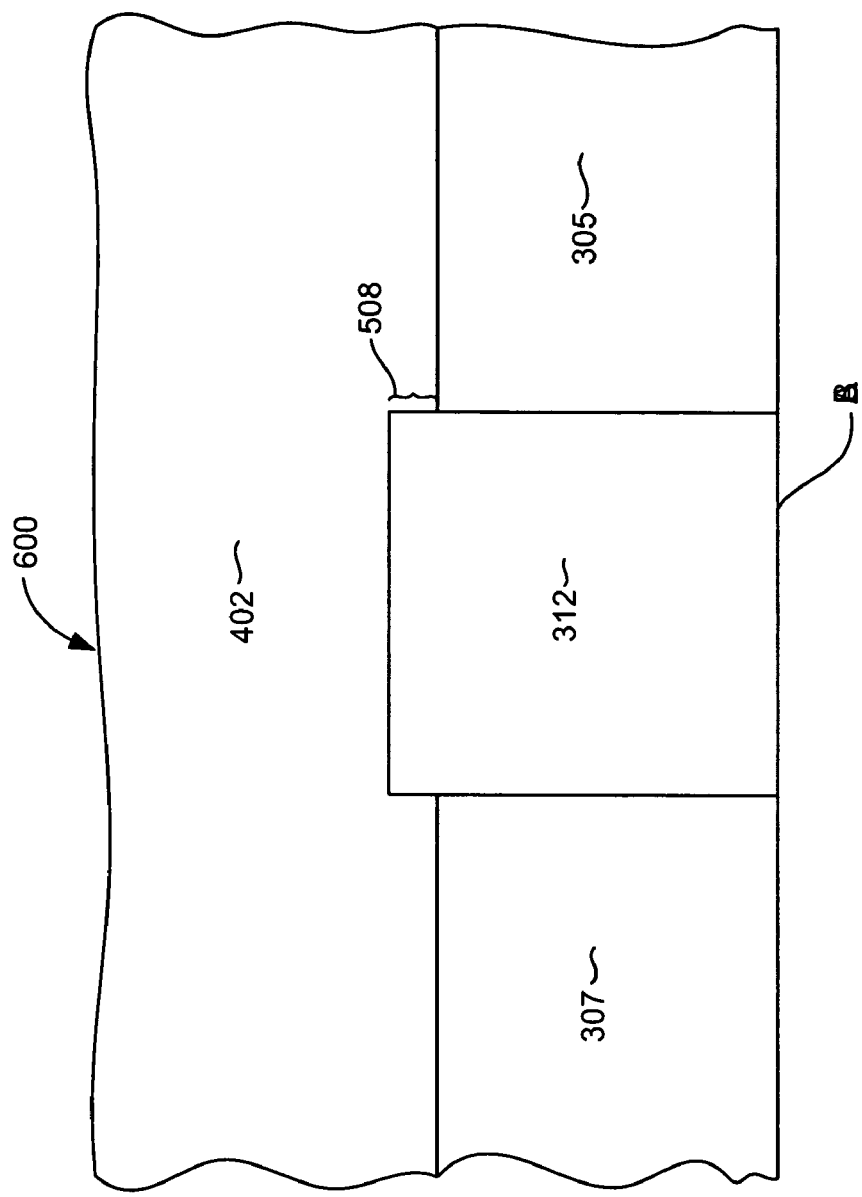
FIG. 6 is a view similar to FIG. 5B showing a sensor according to an embodiment of the invention.

With reference now to FIG. 6, in an alternate embodiment of the invention a sensor 600 can be constructed to have a back flux guide 508, but no front flux guide. In this embodiment, the leads 308, 310 (FIG. 3) and hard bias layers 305, 307 extend to the ABS as does the free layer 312.

Figure 7:
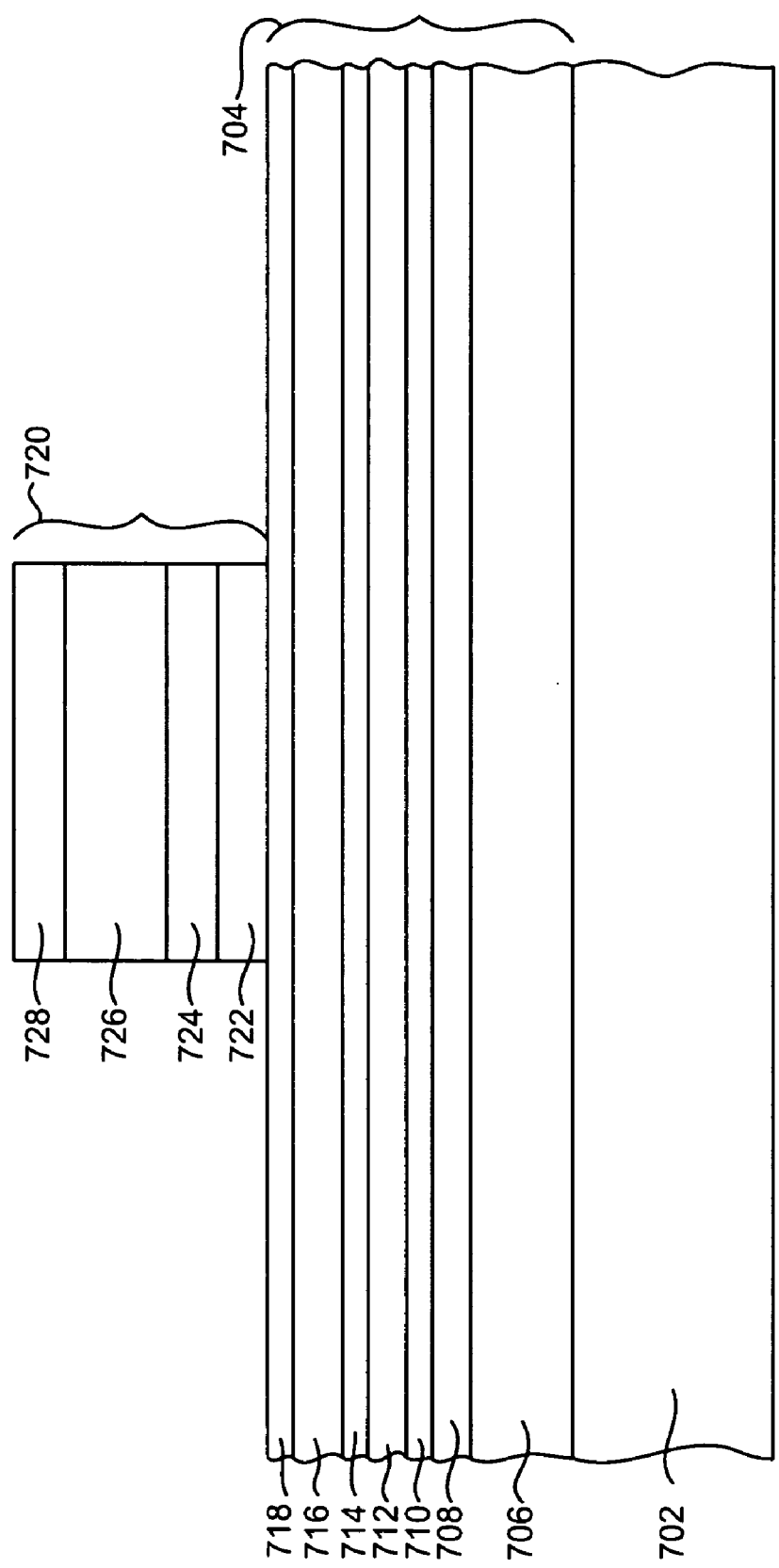
FIGS. 7-18 are views of a sensor in various intermediate stages of manufacture, illustrating a method of manufacturing an invention according to an embodiment of the invention.

With reference now to FIG. 7-18, a method of constructing a magnetoresistive sensor as described in FIGS. 3-6 is described. With particular reference to FIG. 7, a substrate 702 is provided on which a plurality of sensor layers 704 are deposited as full film layers. The substrate 702 can be a non-magnetic, electrically insulating gap layer such as alumina. The sensor layers 704 can include: an antiferromagnetic layer (AFM layer) 706, a first magnetic pinned layer AP1 708, non-magnetic coupling layer 710, second magnetic pinned layer (AP2) 712, non-magnetic spacer layer 714, magnetic free layer 716 and capping layer 718. The sensor layers 704 can be deposited as full film layers.

With continued reference to FIG. 7, a track width defining mask structure 720 is formed over the sensor layers 720. The track width defining mask structure 720 includes a layer of diamond like carbon (DLC) 722, which may be about 200 Angstroms thick. A layer of Rh 724, which may be about 50 Angstroms thick is formed over the DLC layer 722. An image transfer layer 726 is formed over the Rh layer. The image transfer layer 726 can be constructed of a soluble polyimide material such as DURIMIDE® or some similar material. A layer of photosensitive material 728 such as photoresist is formed over the image transfer layer 726.

The mask structure 720 can be formed by depositing the mask layers 722-728 as full film layers. The photosensitive material layer 728 is then photolithographically patterned to define the track width of the sensor. A first reactive ion etch (RIE) can then be performed to transfer the image of the photosensitive layer 728 into the image transfer layer 726. An ion mill can then be performed to transfer the image of the layers 726, 728 onto the Rh layer 724. A second reactive ion etch (RIE) can then be performed to transfer the image of the layers 724, 726, 728 into the DLC layer 722.

Figure 8:
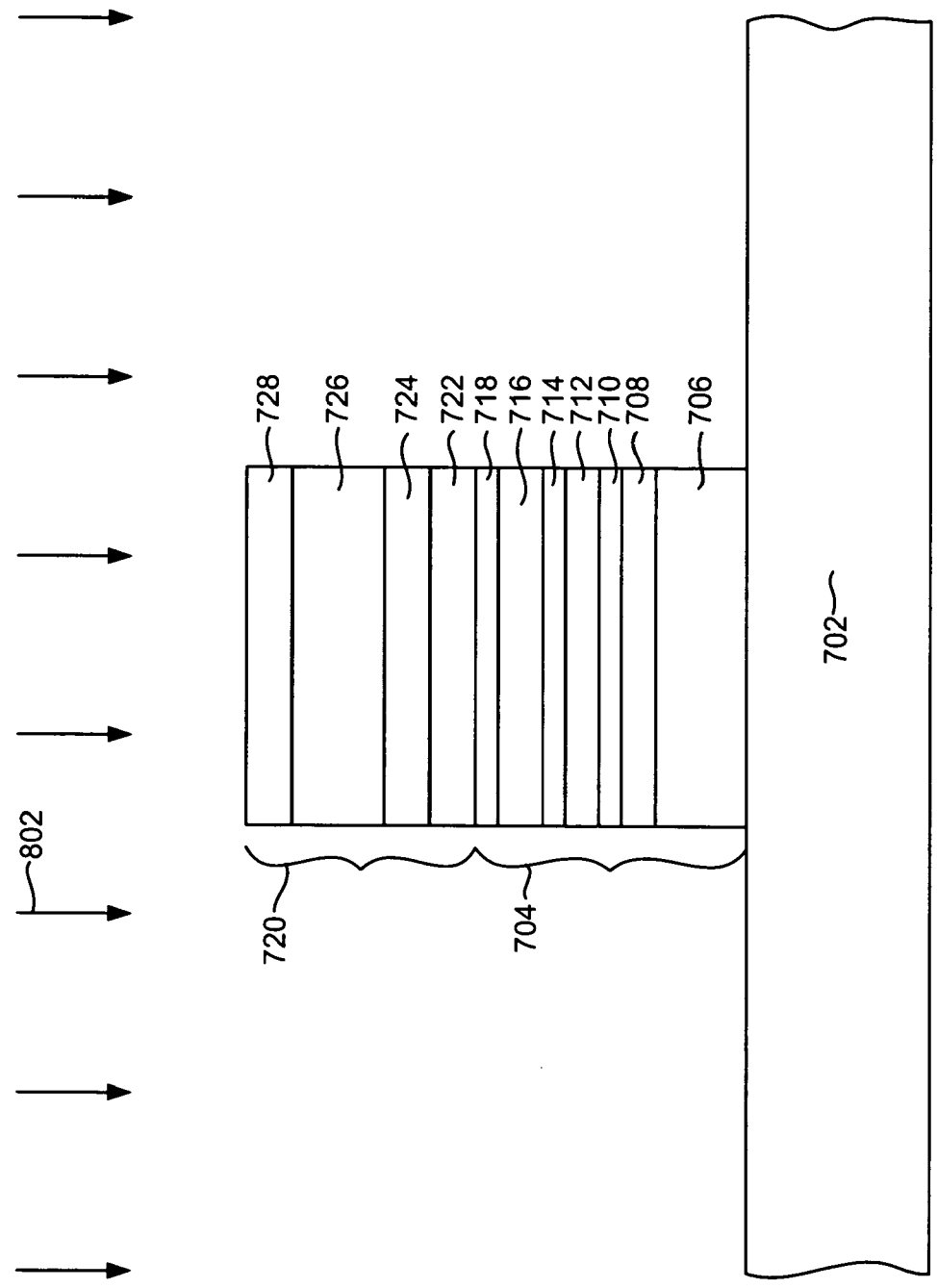
Figure 9:
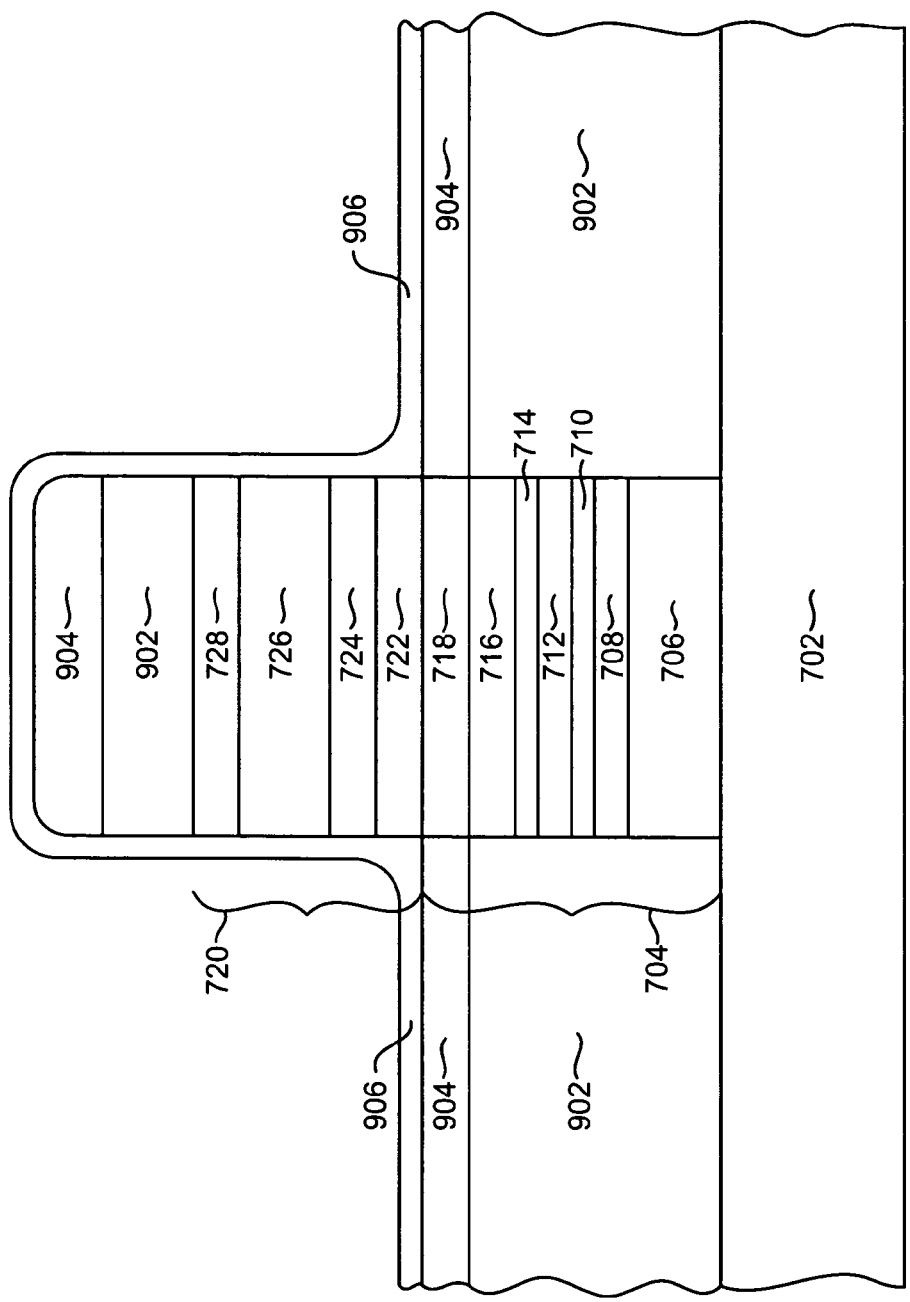

With reference now to FIG. 8, an ion mill 802 is performed (second ion mill) to remove portions of the sensor layers 704 that are not protected by the mask structure 720. The ion mill 802 is preferably performed down to the level of the substrate 702. Then, with reference to FIG. 9, a hard magnetic bias layer material 902 such as CoPtCr is deposited, preferably at least to the level of the free layer 716. An electrically conductive lead material 904 such as Cu, Au, Rh or some other suitable material is deposited over the hard magnetic material 902. A layer of material that is resistant to chemical mechanical polish (CMP) such as diamond like carbon (DLC) 906 can then be deposited.

Figure 10:
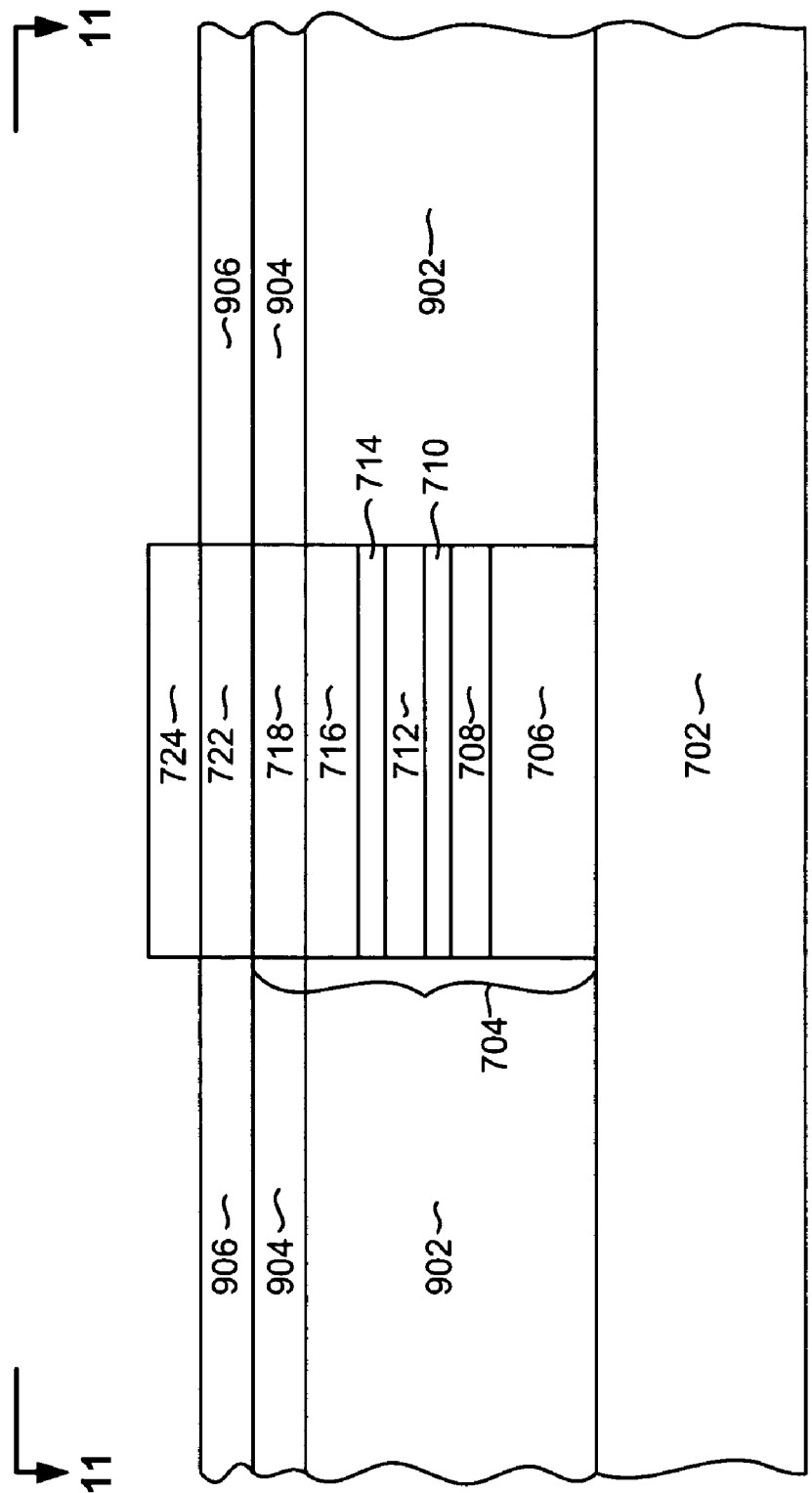

With reference to FIG. 10, a chemical mechanical polish (CMP) is performed to remove any remaining photo layer 728 and image transfer layer 726. After the CMP, a reactive ion etch (RIE) can be performed to remove the remaining CMP stop (DLC) layer 906. The Rh layer 724, which is resistant to CMP and RIE remains.

Figure 11:
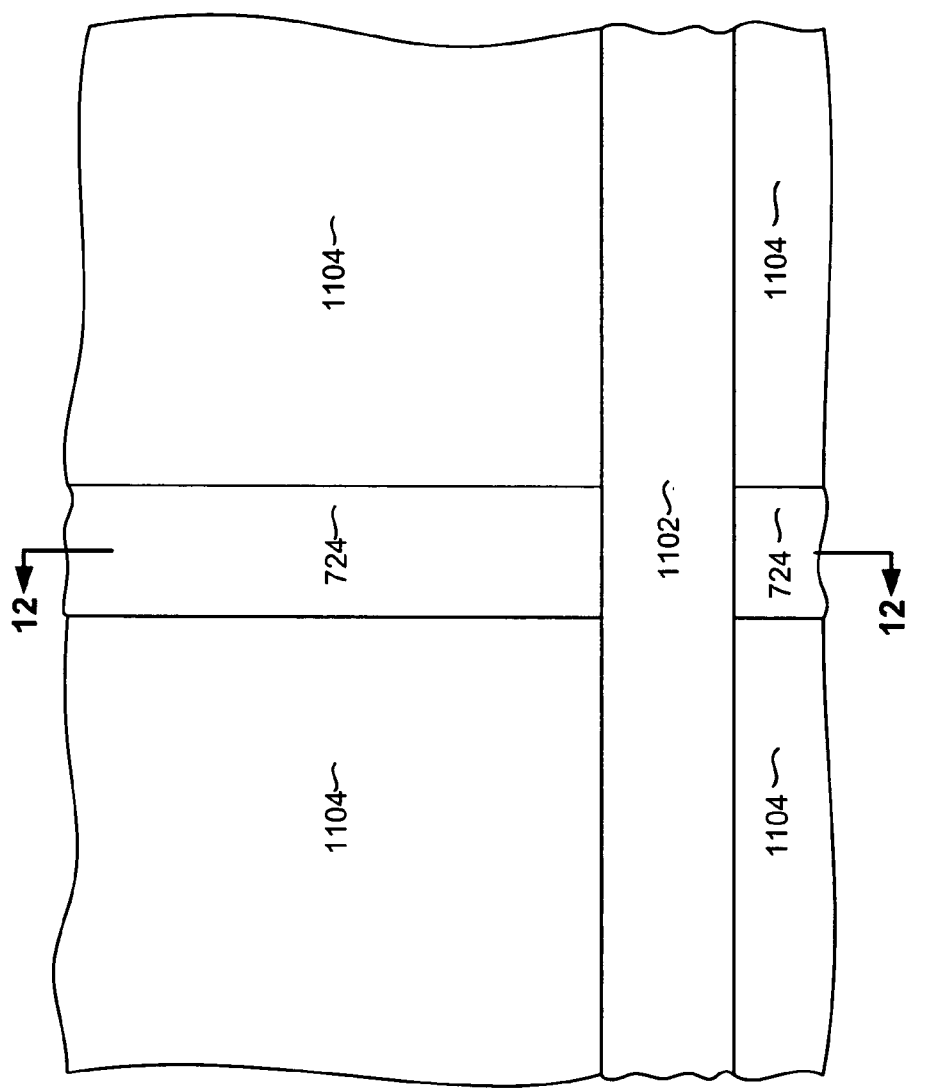

With reference to FIG. 11, a second mask structure 1102 is constructed over the Rh layer 724 and lead layers 904. The second mask structure defines the stripe height dimension of the leads and hard bias layers (SH3 in FIGS. 5A and 5B) as will be described below. With the first and second hard masks 724, 1102 constructed, an ion mill can be performed to remove the hard bias and lead material 902, 904 (FIG. 10) from the areas that are not protected by the mask 1102. The remaining portions of the hard bias and lead layers 902, 904 are hidden beneath the mask 1102 in FIG. 11. The sensor material remains beneath the first mask 724. A non-magnetic, electrically insulating fill layer 1104 can then be deposited to fill the areas from which the hard bias 902 and leads 904 have been removed (ie. in areas not covered by either mask 724 or mask 1102.

Figure 12:
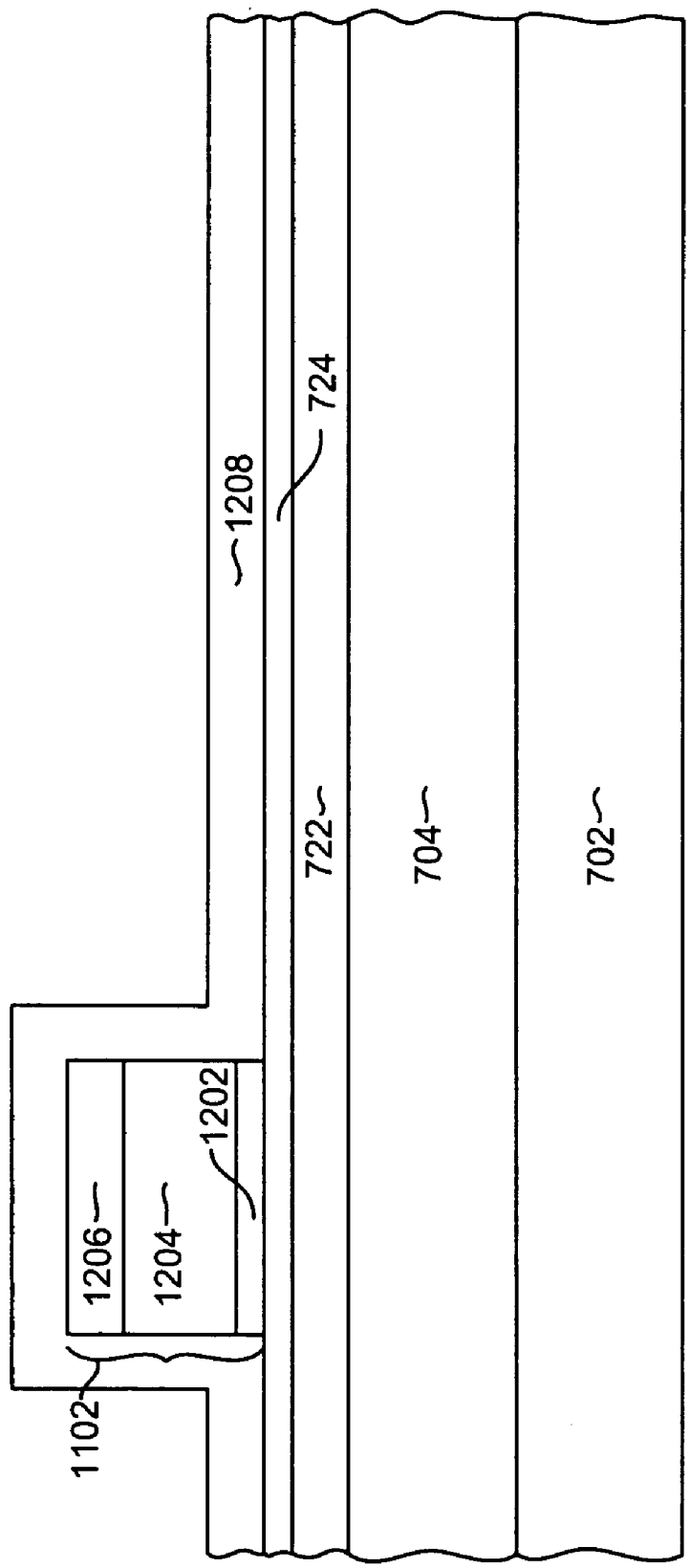

With reference to FIG. 12, the second mask structure 1102 can include a hard mask layer 1202 such as Rh, which may have a thickness of about 50 Angstroms. The second mask may also include an image transfer layer 1204 formed over the hard mask 1202. The image transfer layer can be constructed of a soluble polyimide material such as DURIMIDE®. The second mask 1102 may also include a photosensitive layer 1206 such as photoresist formed over the image transfer layer. The mask 1102 can be formed by photolithographically patterning the photo layer 1206 and then transferring the image of the photo layer 1206 onto the underlying mask layers 1204, 1202.

With continued reference to FIG. 12, a layer of material 1208 is deposited. Although other materials could be used, the layer 1208 is preferably constructed of alumina and will be referred to herein as alumina layer 1208. The alumina layer 1208 is preferably constructed by a conformal deposition method such as atomic layer deposition (ALD) chemical vapor deposition (CVD) etc.

Figure 13:
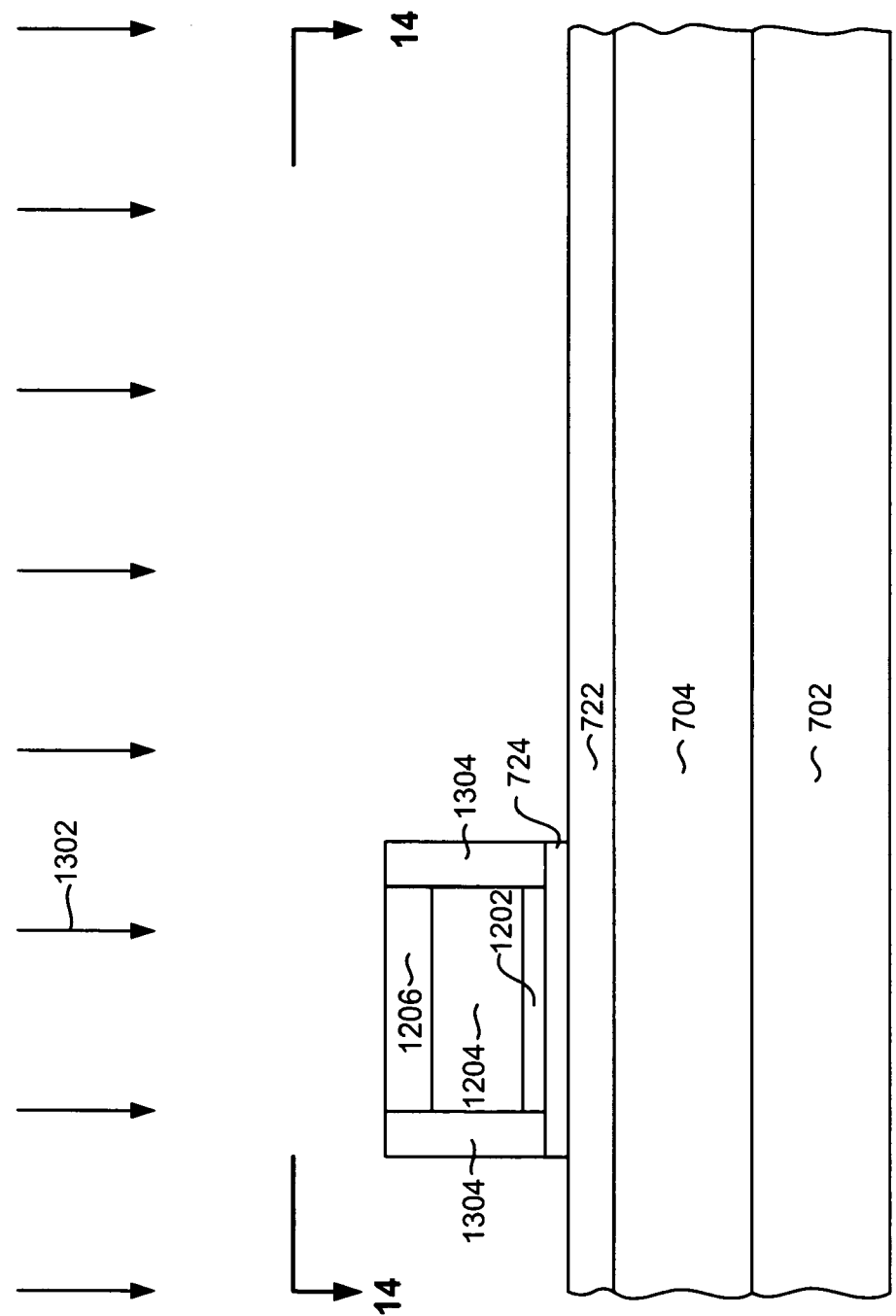
Figure 14:
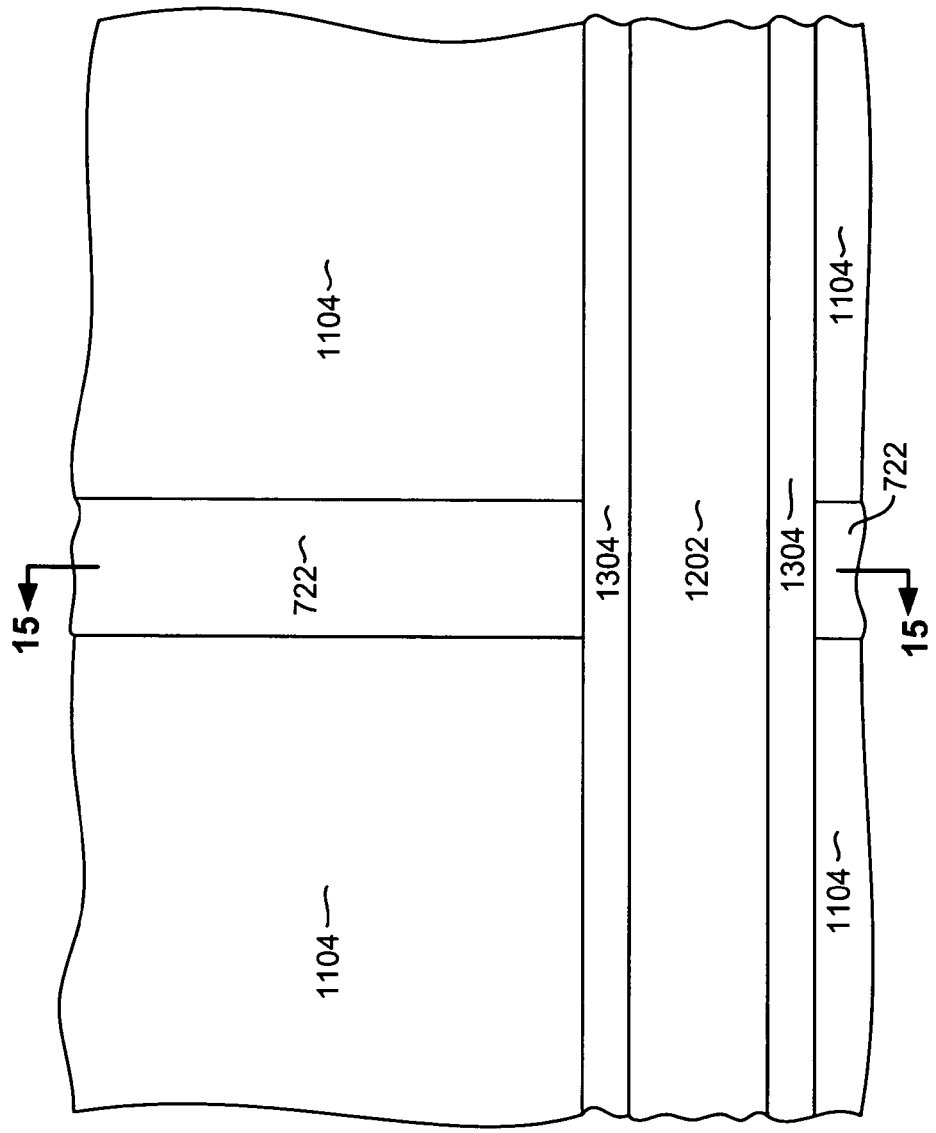

With reference now to FIG. 13, an ion mill 1302 is performed. The ion mill 1302 is a directional material removal process, which preferentially removes the horizontally disposed portions of the alumina layer 1208 as well as the Rh layer 724 (FIG. 12), leaving horizontally disposed alumina side walls 1304 formed at the edges of the mask 1202. With reference to FIG. 14 it can be seen that the alumina side walls 1304 effectively increase the width (stripe height dimension) of the mask structure 1202.

Figure 15:
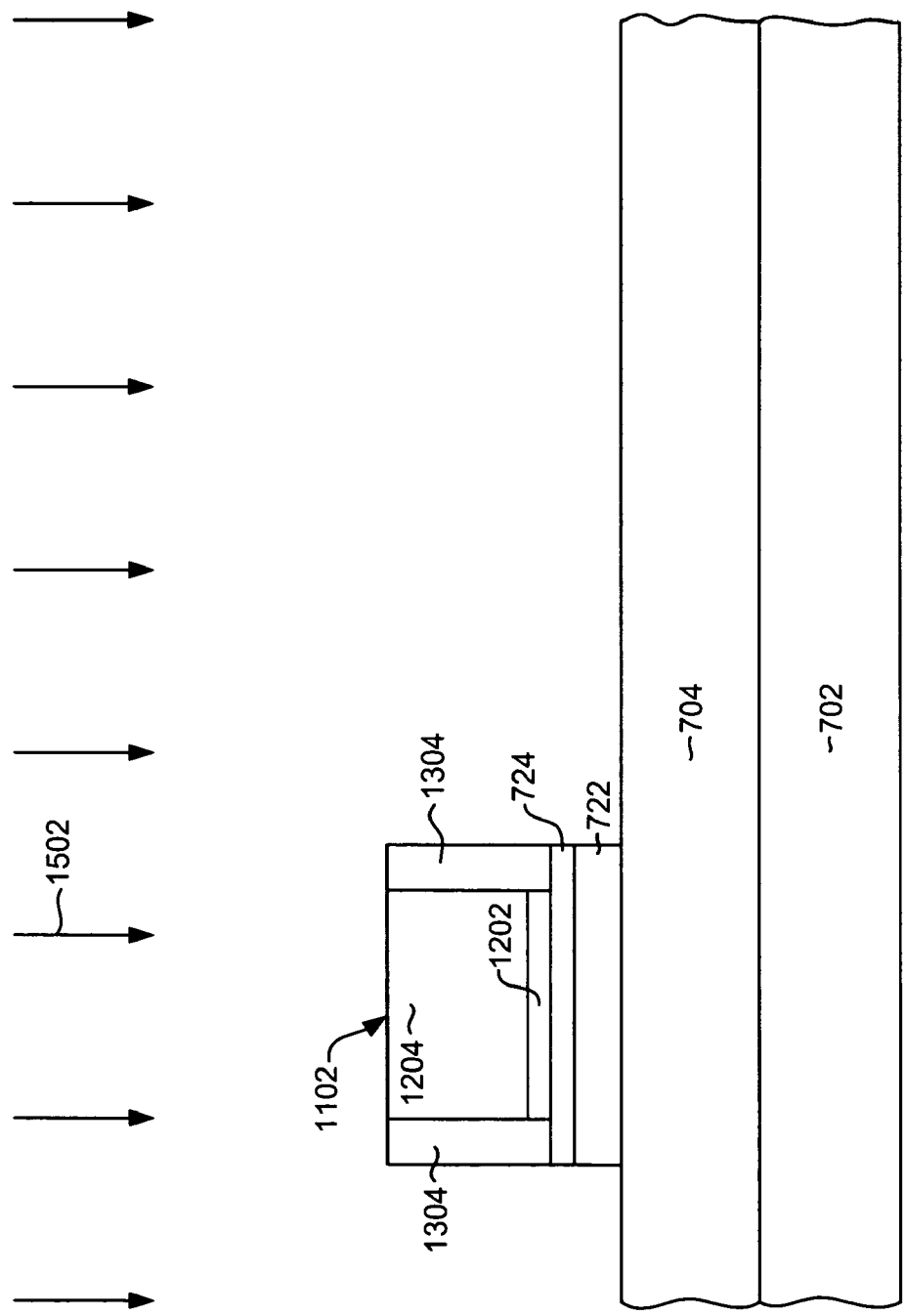
Figure 16:
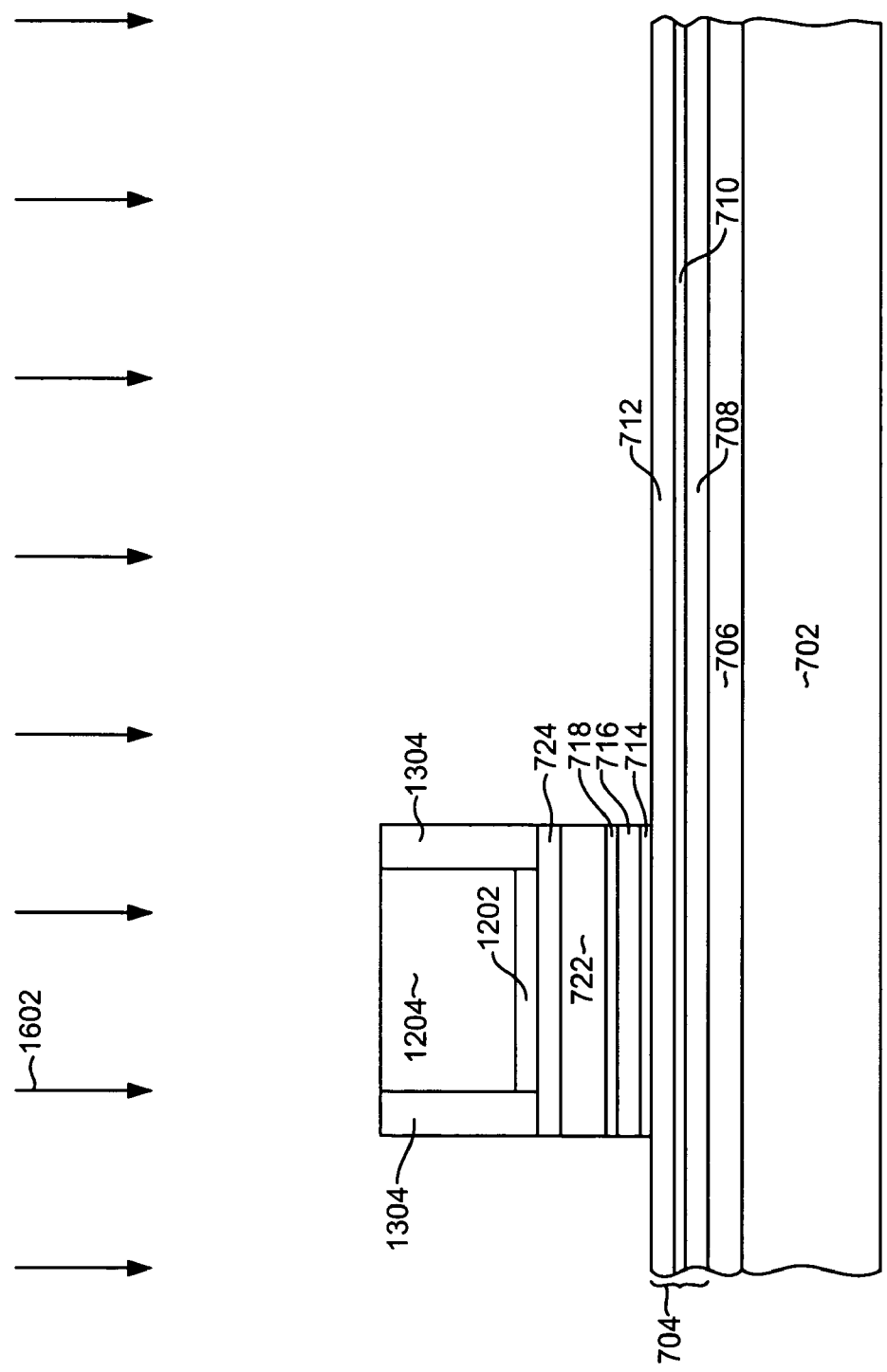

With reference now to FIG. 15, a reactive ion etch 1502 is performed to remove the portions of the DLC layer 722 are not protected by the mask structure 1102. Then, with reference to FIG. 16, an ion mill 1602 is performed to remove portions of the capping layer 718 and free layer 716 that are not covered by the mask 1202 and side walls 1302. It can be seen that this results in a free layer 716 having a stripe height that is larger than that of the leads produced earlier. It can also be seen that the layers of the pinned layer (708, 710, 712) have a stripe height that extends significantly beyond the free layer. The back edge of the layers 708, 710, 712, can be defined by a separate masking and milling step, not shown here, which can result in a pinned layer structure having a stripe height that is a desired amount greater than that of the free layer 716.

Figure 17:
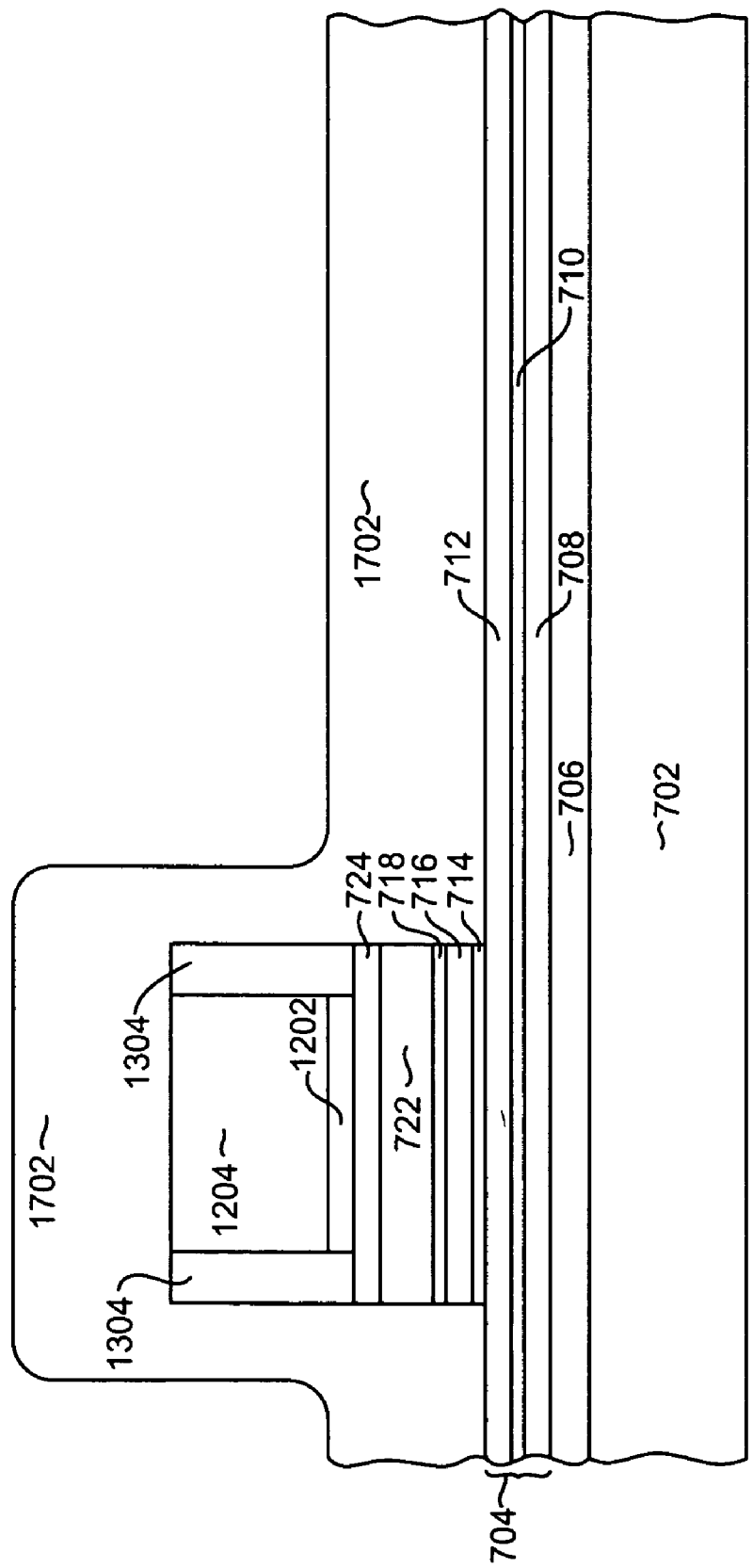
Figure 18:
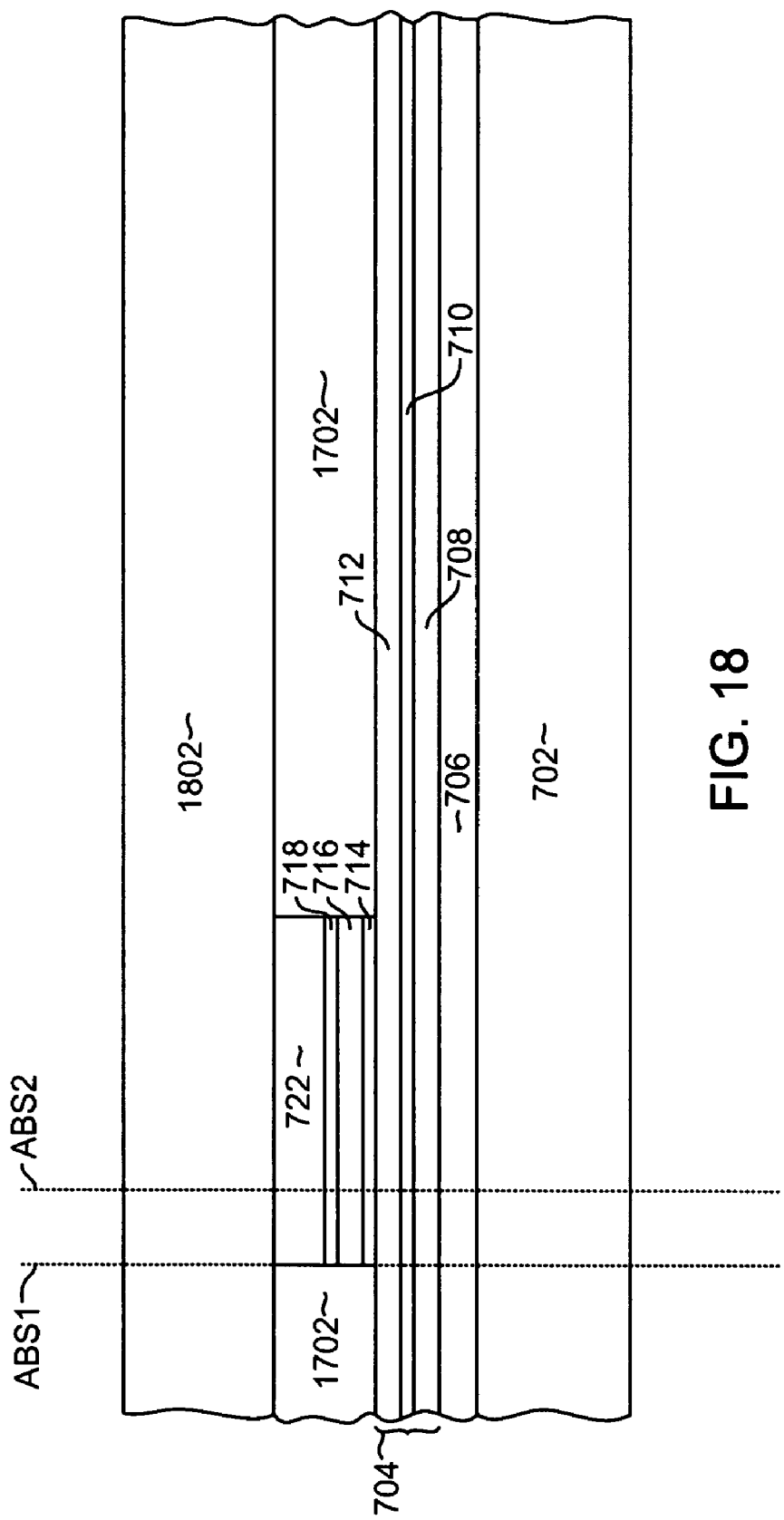

With reference now to FIG. 17, a non-magnetic, electrically insulating fill material 1702 such as alumina is deposited to fill the areas where the cap layer 718 and free layer 716 were removed. A chemical mechanical polish can then be performed to planarize the structure and remove the mask layers 1202, 1204, 1304. With reference now to FIG. 18, a second non-magnetic, electrically insulating gap layer 1802 is deposited. As will be appreciated by those skilled in the art, a wafer on which a plurality of sensors is constructed can be cut into rows of sliders. These rows can undergo a lapping process to define an air bearing surface. To construct a sensor having a front flux guide as described in FIG. 5B, the lapping can be performed until the free layer is reached, such as to the line denoted as ABS1. The size of the flux guide can be controlled by the amount of lapping. In order to construct a sensor having no front flux guide such as that described with reference to FIG. 6, the lapping process can be performed to a point that reaches both the leads and the sensor layers, the location being denoted by line ABS2. In other words, the front of the mask second mask 1102 would extend beyond the ABS location, perhaps indefinitely beyond the ABS location so that when lapping is performed to define the ABS, the leads, free layer, and entire sensor stack would extend to the ABS.

Figure 19:
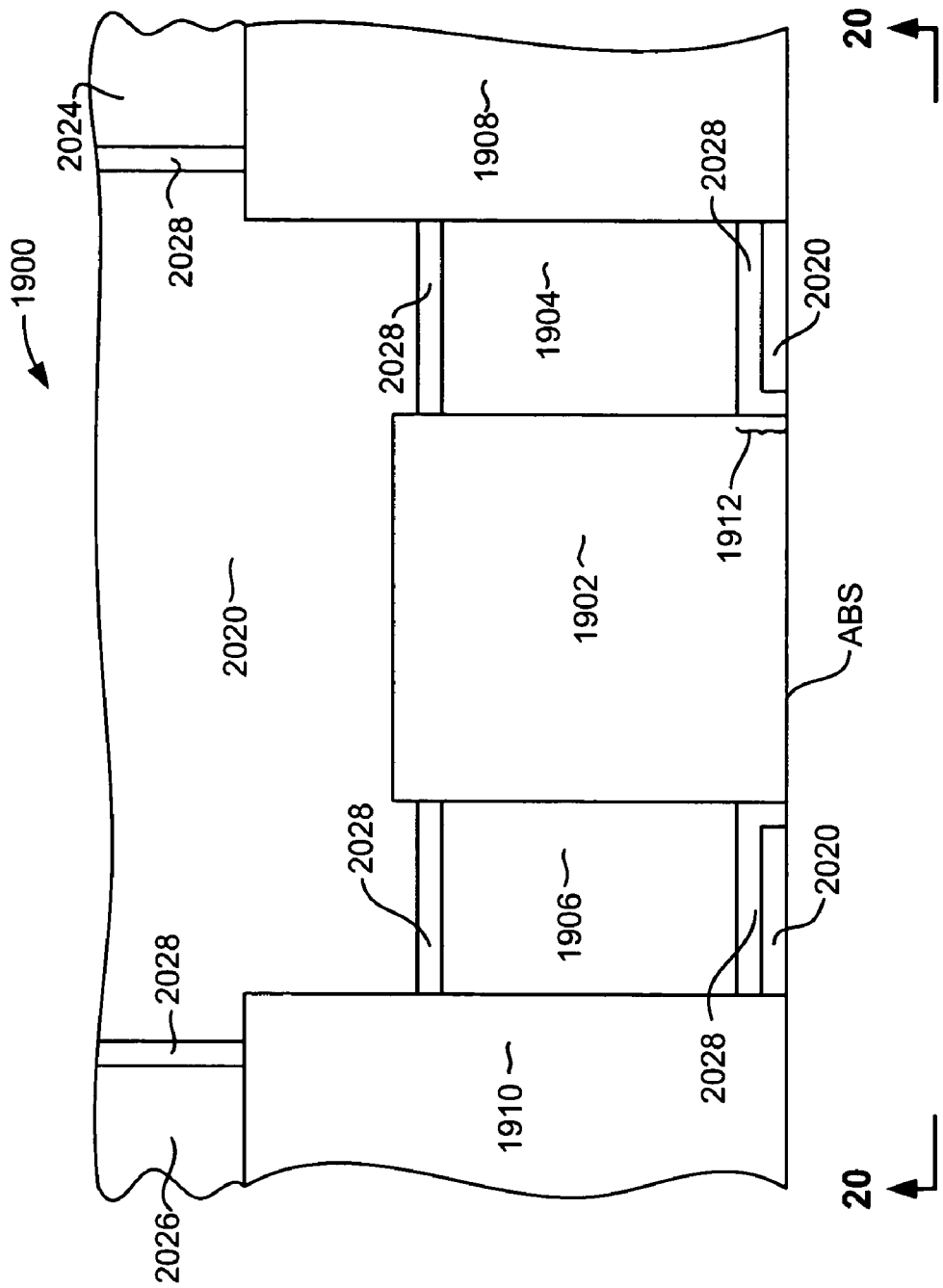
FIG. 19 is a top down view illustrating a magnetoresistive sensor according to another embodiment of the invention.

With reference now to FIG. 19, an embodiment of a magnetoresistive sensor 1900, having damage free virtual edges is described. The sensor includes a sensor stack 1902, and first and second bottom leads 1904, 1906. And first and second top leads 1908, 1910. The bottom leads 1904, 1906 are electrically connected with the sensor stack 1902, and as can be seen in FIG. 19 have a shorter stripe height than the sensor stack 1902, resulting in front and back flux guides which will be described in greater detail below.

Figure 20:
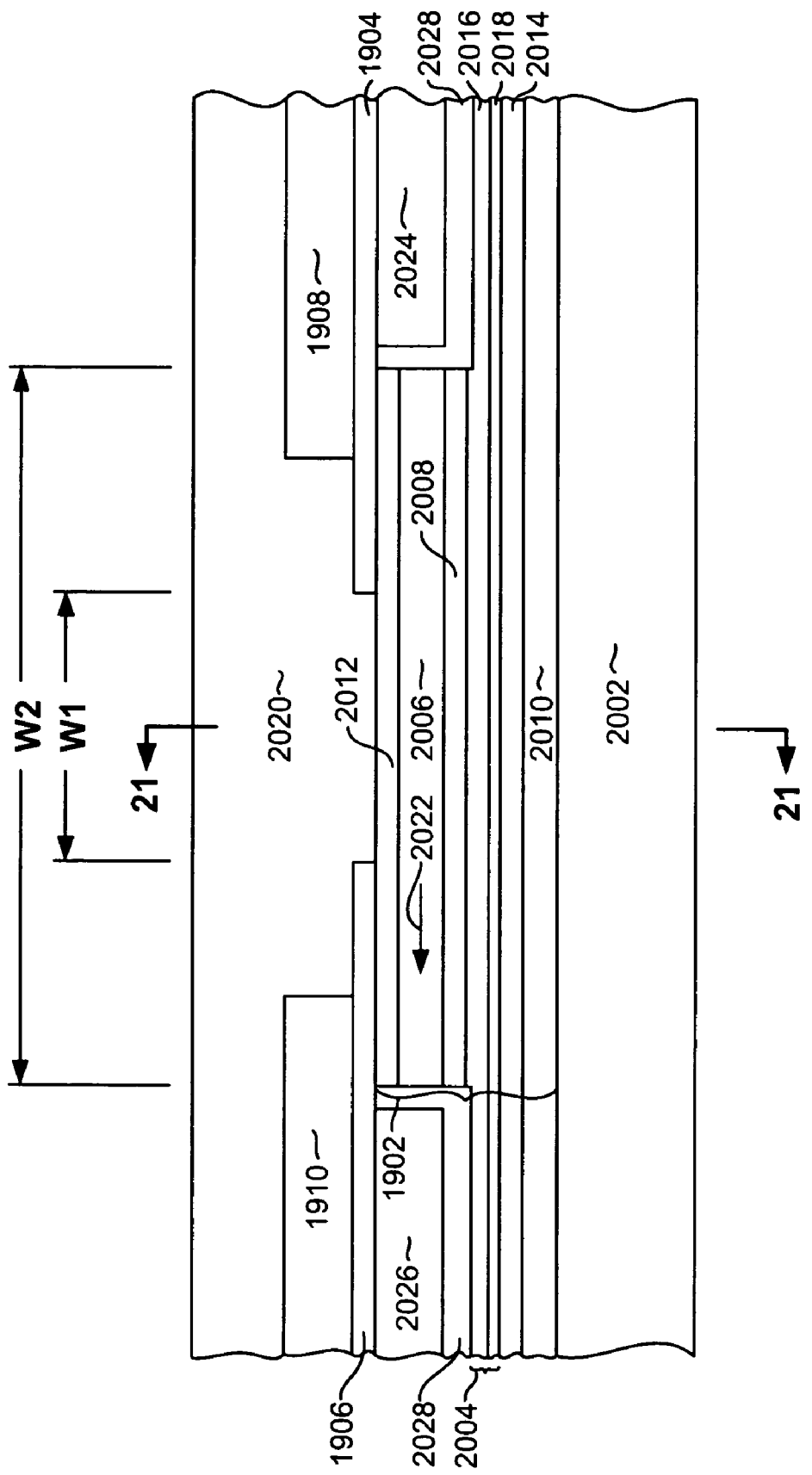
FIG. 20 is an ABS view taken from line 20-20 of FIG. 19.

With reference now to FIG. 20, the sensor stack 1902 includes a first non-magnetic, electrically insulating gap layer 2002. The sensor stack 1902 is constructed upon the first gap layer 2002, and includes a pinned layer structure 2004, a magnetic free layer 2006 and a non-magnetic, electrically conductive spacer layer 2008 sandwiched between the free layer 2006 and the pinned layer 2004. An antiferromagnetic layer (AFM layer) 2010 such as PtMn or IrMn is in contact with the pinned layer structure 2004.

The free layer 2006 can be constructed of CoFe, NiFe or some combination of these or other materials. The spacer 2008 layer can be, for example Cu or some other non-magnetic, electrically conductive material. A capping layer 2012 can be provided at the top of the sensor stack 1902 to protect the sensor layers from damage during manufacture.

The pinned layer structure 2004 can include a first magnetic layer (AP1) 2014, a second magnetic layer (AP2) 2016, and a non-magnetic antiparallel coupling layer (AP coupling layer) 2018 sandwiched between the AP1 and AP2 layers 2014, 2016. The AP1 and AP2 layers 2014, 2016 are antiparallel coupled across the AP coupling layer 2018. The AP1 layer 2014 is exchange coupled with the AFM layer 2010, which strongly pins the magnetization of the AP1 layer 2014 in a desired direction perpendicular to the ABS. AP coupling between the AP1 and AP2 layers strongly pins the magnetization of the AP2 layer 2016 in a direction opposite to that of the AP1 layer 2014 and perpendicular to the ABS. The AP1 and AP2 layers 2014, 2016 can be constructed of, for example CoFe or some other suitable magnetic material and the AP coupling layer 2018 can be constructed of, for example, Ru. The sensor stack 1902 as well as the leads 1904, 1906, 1908, 1910 are sandwiched between the first electrically insulating gap layer 2002 and a second electrically insulating gap layer 2020, which may be constructed of alumina or some other non-magnetic, electrically insulating material.

With continued reference to FIG. 20, the first and second bottom leads 1904, 1906 extend inward over the sensor stack 1902, terminating at inner ends that are separated from one another by a width W1. It can also be seen that the free layer 2006 extends laterally outward to outer edges that are separated by a distance W2 that is significantly larger than W1. In fact, W2 may be 1.5 times W1 or larger. The capping layer 2012 also terminates at outer edges separated by the distance W2. The other layers of the sensor stack 1902, such as the spacer 2008, pinned layer structure 2004 and AFM layer may terminate at the width W2 or may extend beyond W2 as shown in FIG. 20.

As mentioned above in the Background of the Invention, manufacturing processes used to form the sensor, such as ion milling, cause damage to the outer edges of the sensor layers such as the free layer. However, since the bottom leads 1904, 1906 extend inward over the sensor stack 1902, the leads 1904, 1906 bring the effective track width of the sensor inward from the physical edges of the free layer 2006 (ie. inward from the W2). The effective track width of the sensor is somewhere between W1 and W2.

With continued reference to FIG. 20, the free layer 2006 has a magnetization 2022 that is biased in a desired direction parallel with the ABS, but which is free to rotate in response to a magnetic field. Biasing is maintained by first and second hard bias layers 2024, 2026, which can be constructed of a hard magnetic material such as CoPtCr, CoPt or some similar material or combination of materials. The hard bias layers 2024, 2026 are separated from the free layer 2006 and from the rest of the sensor stack 1902 by a thin, conformally deposited insulation layer 2028, which can be, for example, alumina. Referring back to FIG. 19 it can be seen that the insulation layer 2028 also extends back in the strip height direction and covers the front and back edges of the hard bias layers 2024, 2026.

Figure 21:
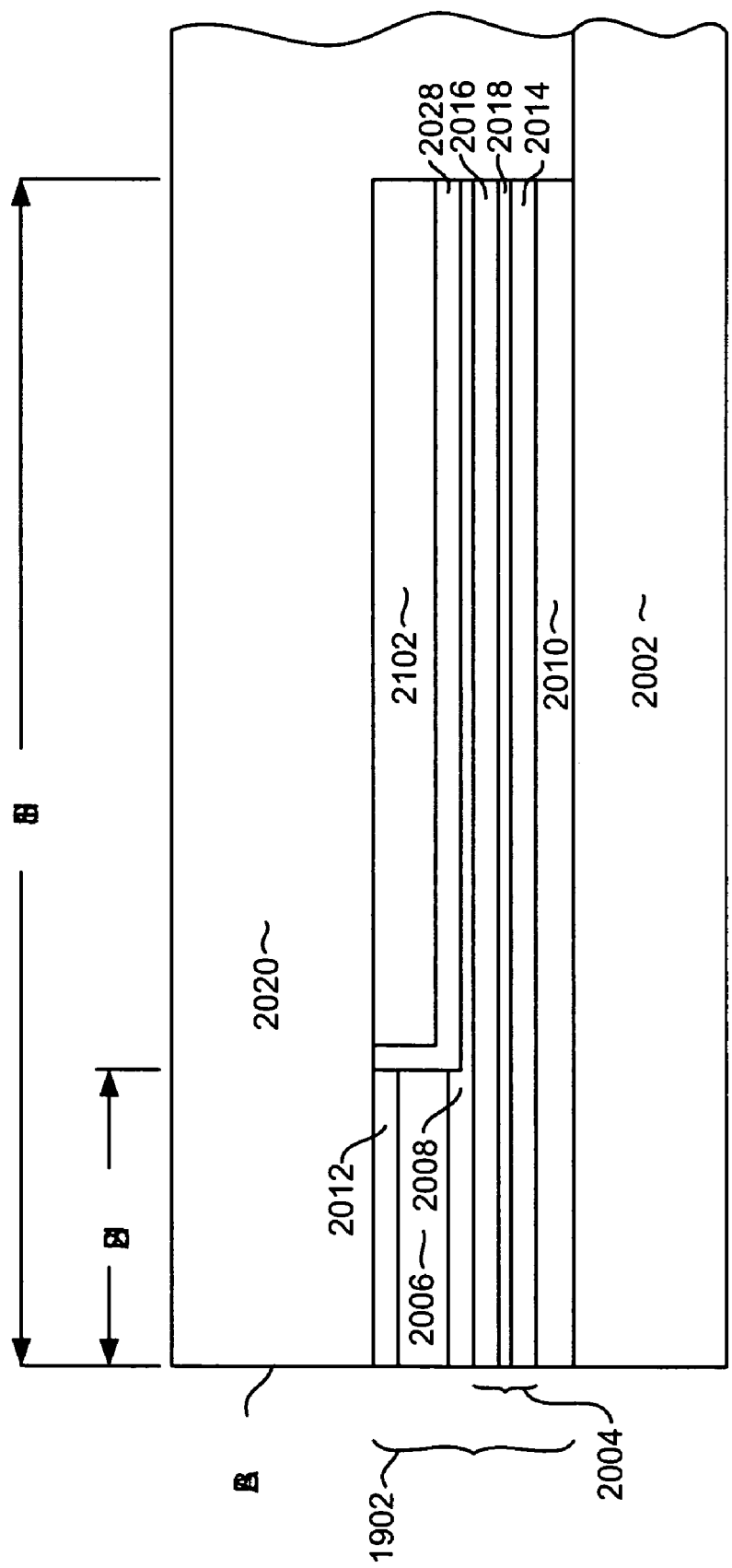
FIG. 21 is a cross sectional view taken from line 21-21 of FIG. 20-20.

With reference now to FIG. 21, a cross sectional view of the read head 1902 shows that the pinned layer is extended to a first stripe height distance SH1, while the free layer and capping layer have a shorter stripe height SH2. This is similar to the earlier described embodiment. All, a portion, or none of the spacer layer 2008 can extend to the longer stripe height SH1. A non-magnetic fill layer 2102 fills the space between the pinned layer 2004 and the second gap layer 2020 and also fills the space behind the pinned layer 2004 (ie. beyond the stripe height of the pinned layer).

With reference again to FIG. 19, the bottom leads 1904, 1906 have a stripe height dimension, measured perpendicular to the ABS that is smaller than the physical stripe height of the sensor stack 1902. Similarly, the hard bias layers 2024, 2026, which can be seen in FIG. 20, but are hidden from view in FIG. 19, each have a stripe height that is the same as (and is self aligned with) that of the bottom leads 1904, 1906. The stripe height dimension of the hard bias layers 2024, 2026 and leads 1904, 1906 determine the effective stripe height of the sensor, this effective stripe height being smaller than the physical stripe height of the sensor (as measured from the ABS). This results in a front flux guide 1912 and a back flux guide 1914. Alternatively, the sensor could be constructed with a back flux guide and no front flux guide. In that case, the leads 1904, 1906 and the hard bias layers 2024, 2026 there beneath would extend to the ABS.

Figure 22:
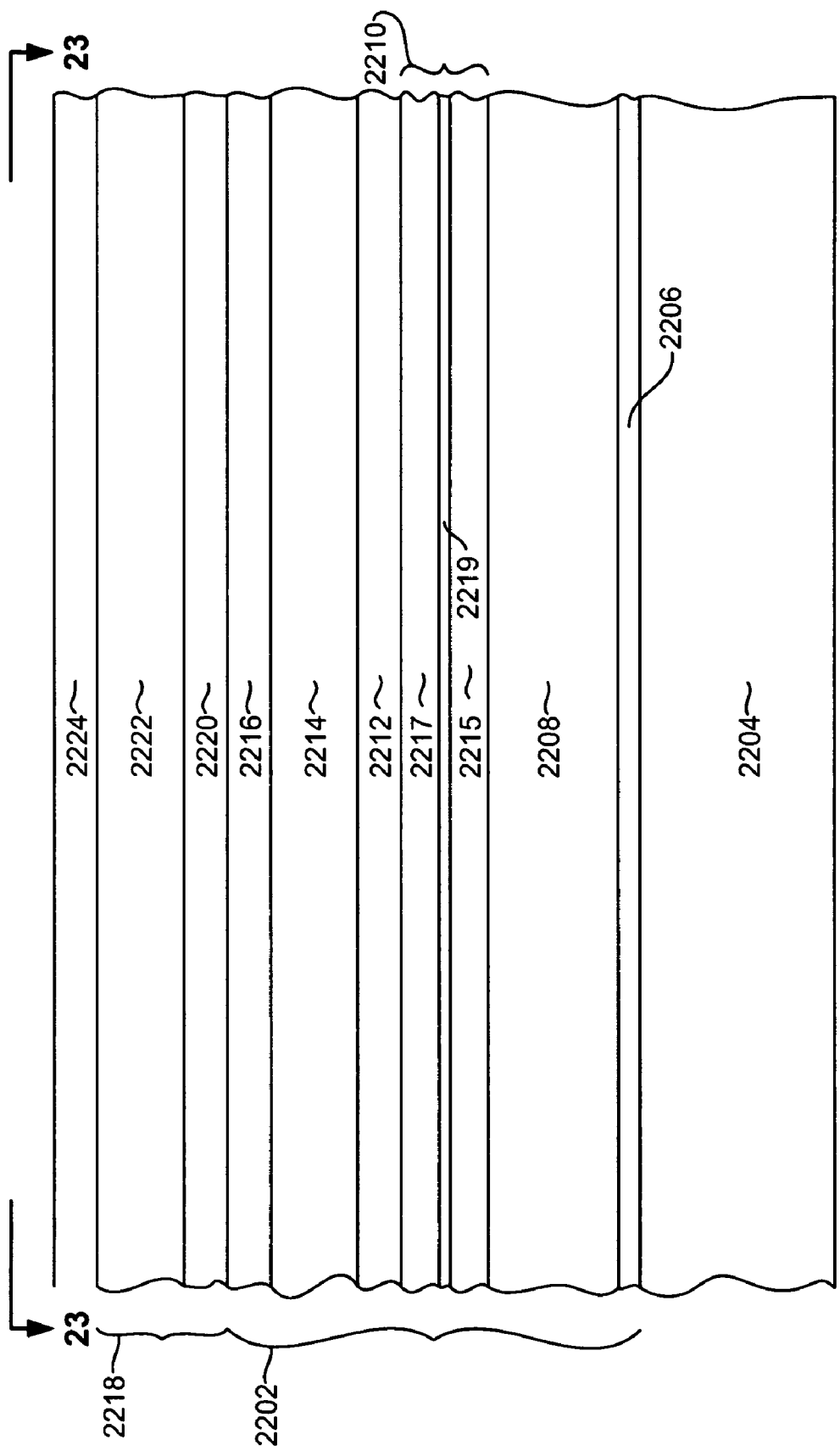
FIGS. 22-42 are views showing a magnetoresistive sensor in various intermediate stages of manufacture illustrating a method of manufacturing a sensor according to an embodiment of the invention.
Figure 23:
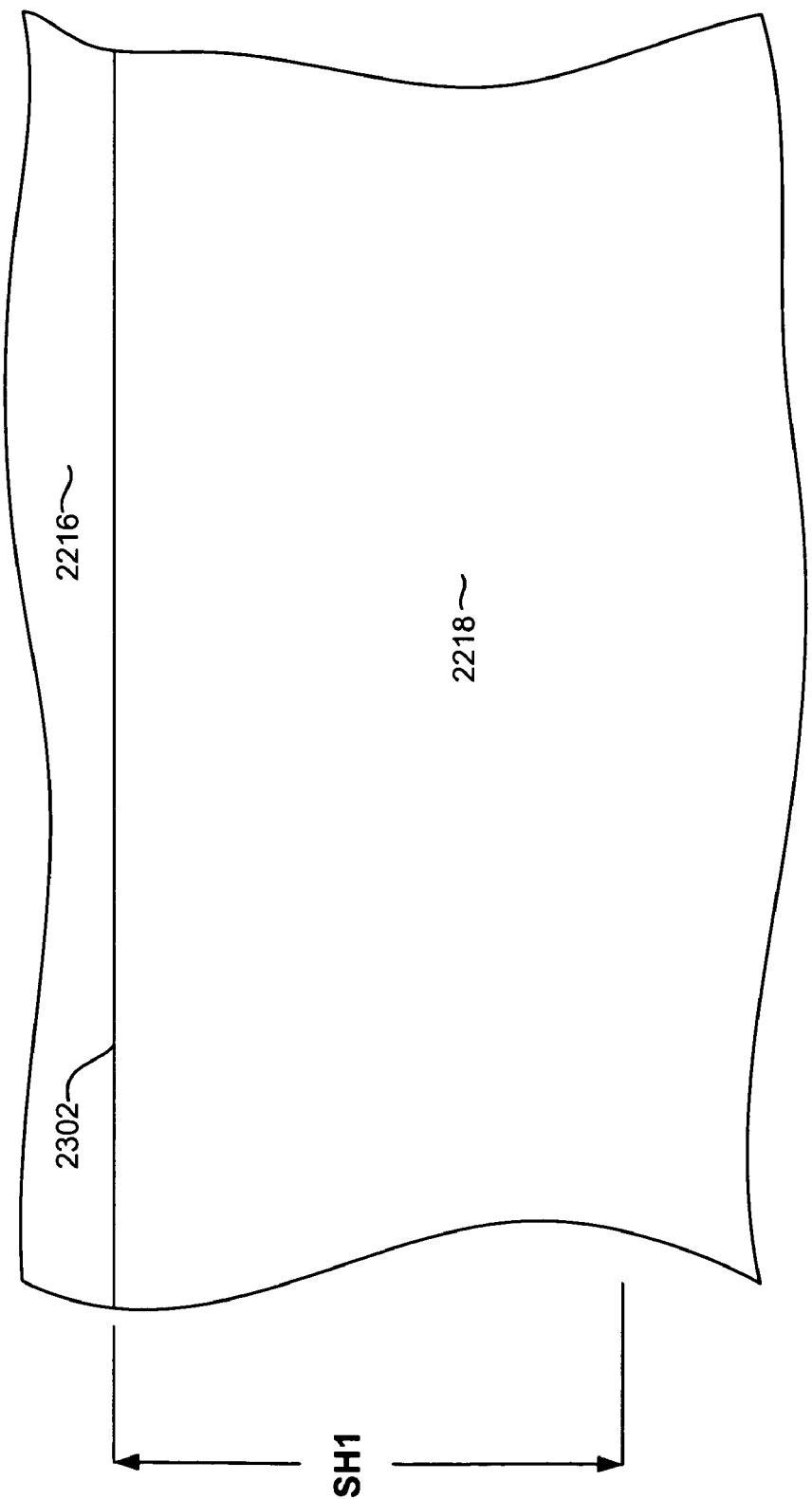

With reference now to FIGS. 22-42 a method for constructing a sensor having damage free virtual edges and shape enhanced pinning is described. With particular reference to FIG. 22, a plurality of sensor layers 2202 is deposited over a substrate 2204 which can be a non-magnetic, electrically insulating gap layer such as alumina. The sensor layers can include a seed layer 2206; AFM layer 2208; pinned layer structure 2210 which can be an AP pinned structure including first and second magnetic layers AP1, AP2 2215, 2217 and a non-magnetic AP coupling layer 2219 sandwiched there between; a non-magnetic spacer layer 2212 such as Cu; a magnetic free layer 2214 and a capping layer 2216 such as Ta. A pinned layer stripe height defining mask layer 2218 is then deposited over the sensor layers to define the back edge 2302 of the sensor (more particularly the stripe height) as can be seen more clearly with reference to FIG. 23. With reference to FIG. 22, the pinned layer stripe height defining mask layer 2218 can include a hard mask layer 2220 such as Rh or diamond like carbon (DLC), an image transfer layer 2222 such as DURAMIDE®, and a photoresist layer 2224. To construct the mask 2218, the photoresist layer 2224 is photolithographically patterned, and the image of the resulting photomask 2224 is then transferred onto the underlying mask layers. The mask 2218 has a stripe height dimension (SH1) measured from an intended ABS location (the ABS not yet having been formed). An ion mill process (not shown) can be performed to remove portions of the sensor layer 2202 that are not protected by the mask 2218.

Figure 24:
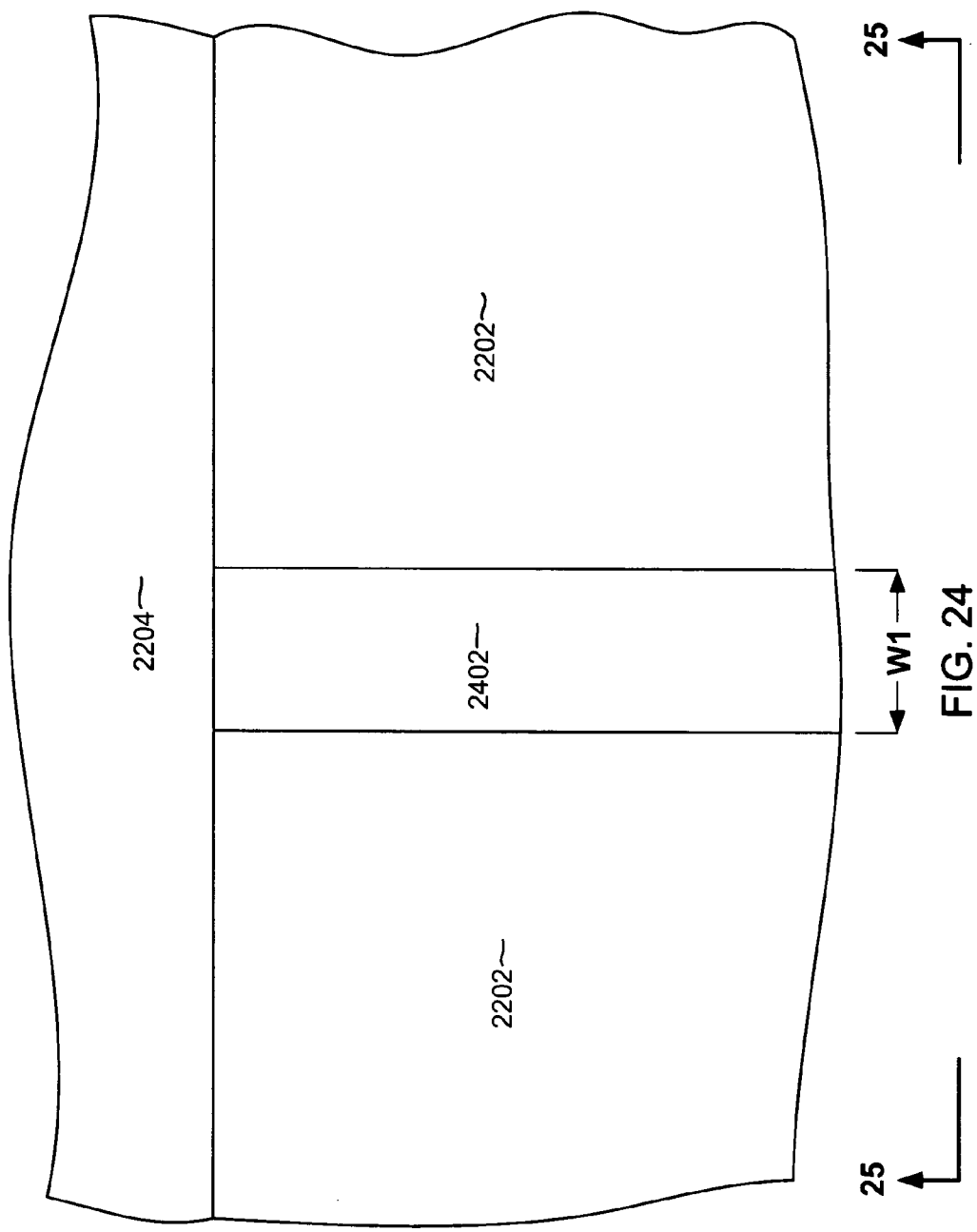
Figure 25:
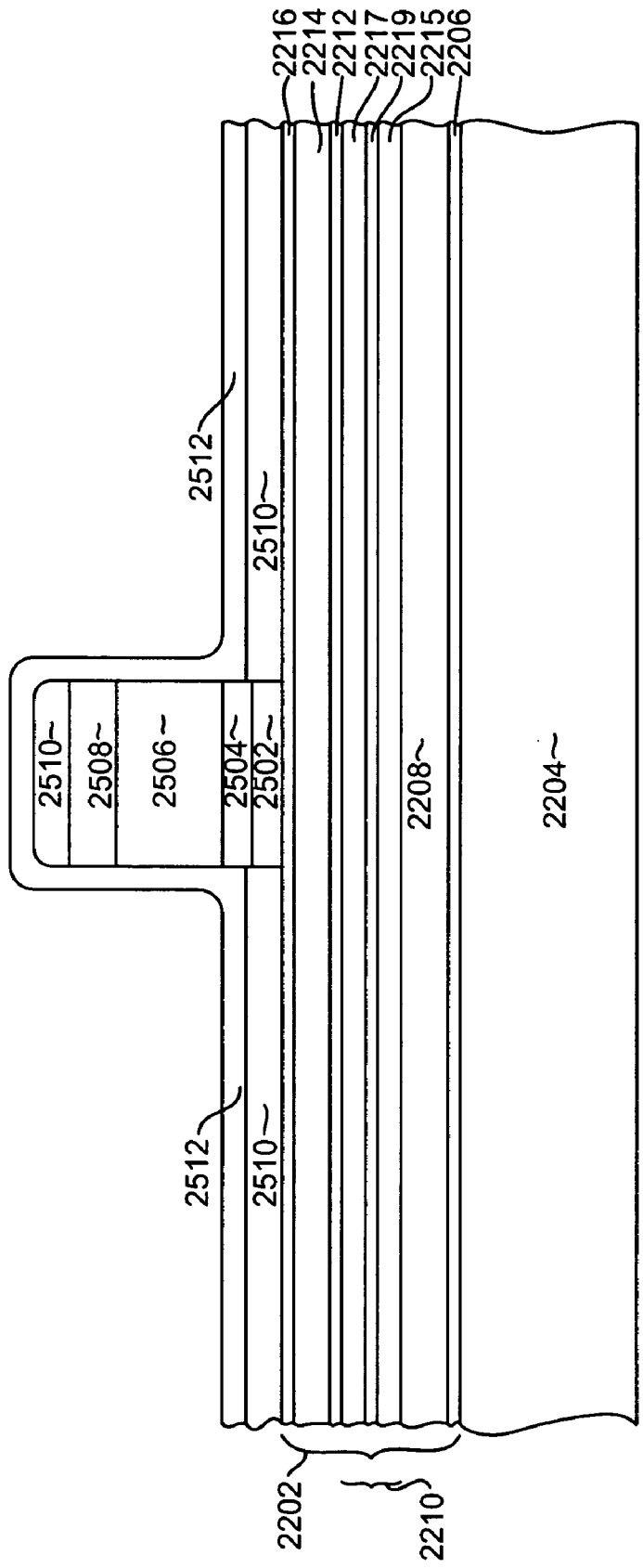

With reference now to FIG. 24, a track width defining mask structure 2402 is constructed with a width (W1) that defines the inner edges of leads in a lead overlay structure such as that described above. With reference to FIG. 25, it can be seen that the mask 2402 can include a first hard mask layer such as diamond like carbon (DLC) 2502, a second hard mask structure 2504 constructed of a material that is resistant to both reactive ion etching (RIE) and CMP, such as Rh, an image transfer layer 2506 which can be a soluble polyimide solution such as DURIMIDE® and a photo mask layer 2508 such as photoresist.

Figure 26:
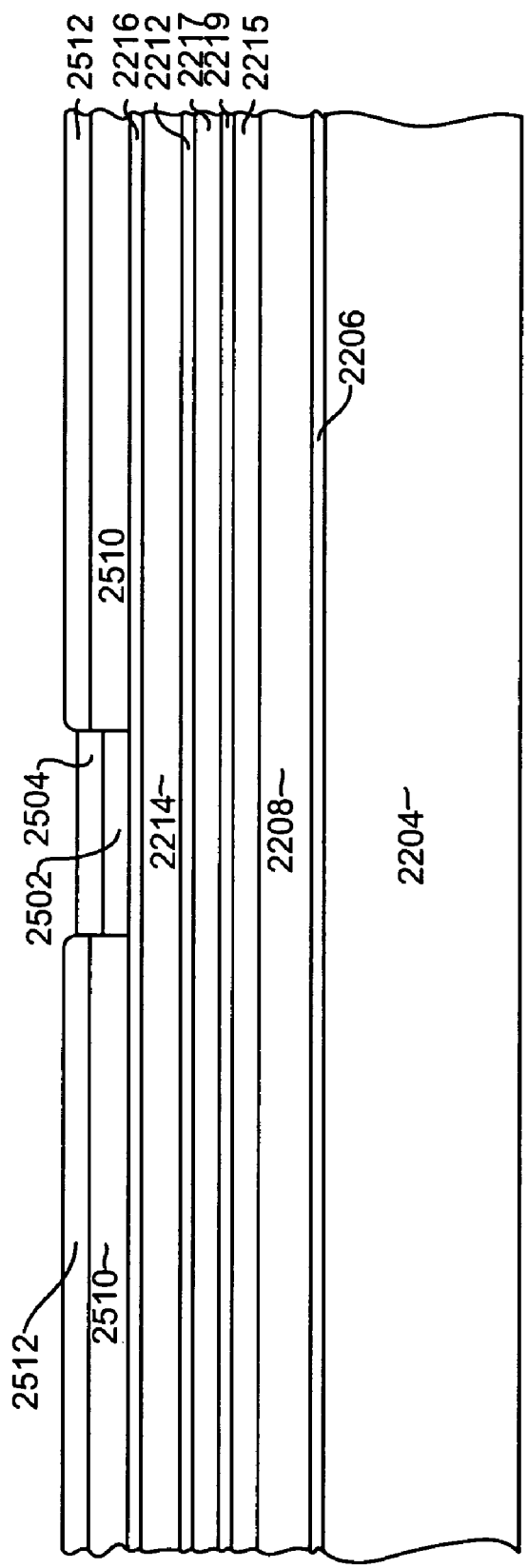
Figure 27:
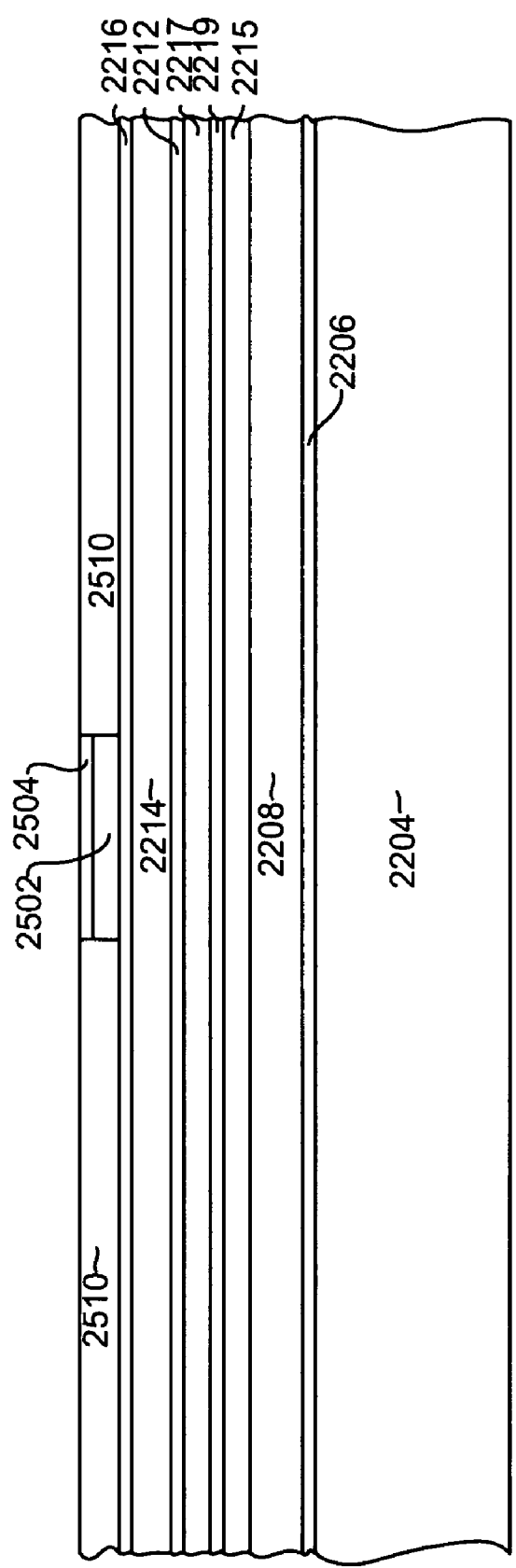

With continued reference to FIG. 25, an electrically conductive lead material 2510 such as Cu, Rh, Ag etc. is deposited. A CMP resistant material 2512 such as diamond like carbon DLC may be deposited over the lead material 2510. With reference now to FIG. 26, A chemical mechanical polish CMP is performed to remove portions of the mask structure 2402, leaving the DLC layer 2502 and Rh layer 2504 intact. Then, with reference to FIG. 27 a reactive ion etch (RIE) 2702 is performed to remove the second deposited DLC layer 2512. The first deposited DLC layer 2502, which is protected by the Rh, layer 2504 remains intact.

Figure 28:
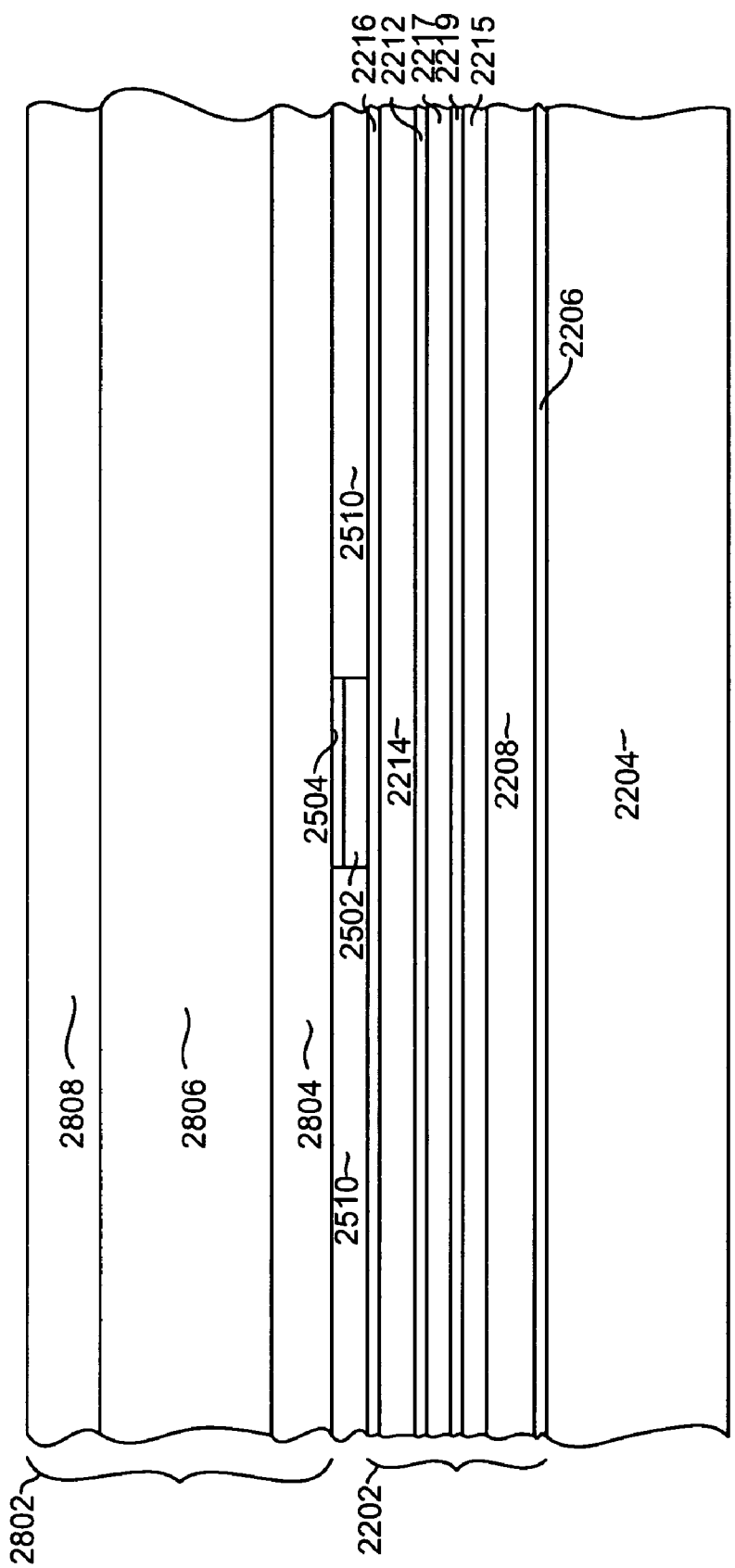
Figure 29:
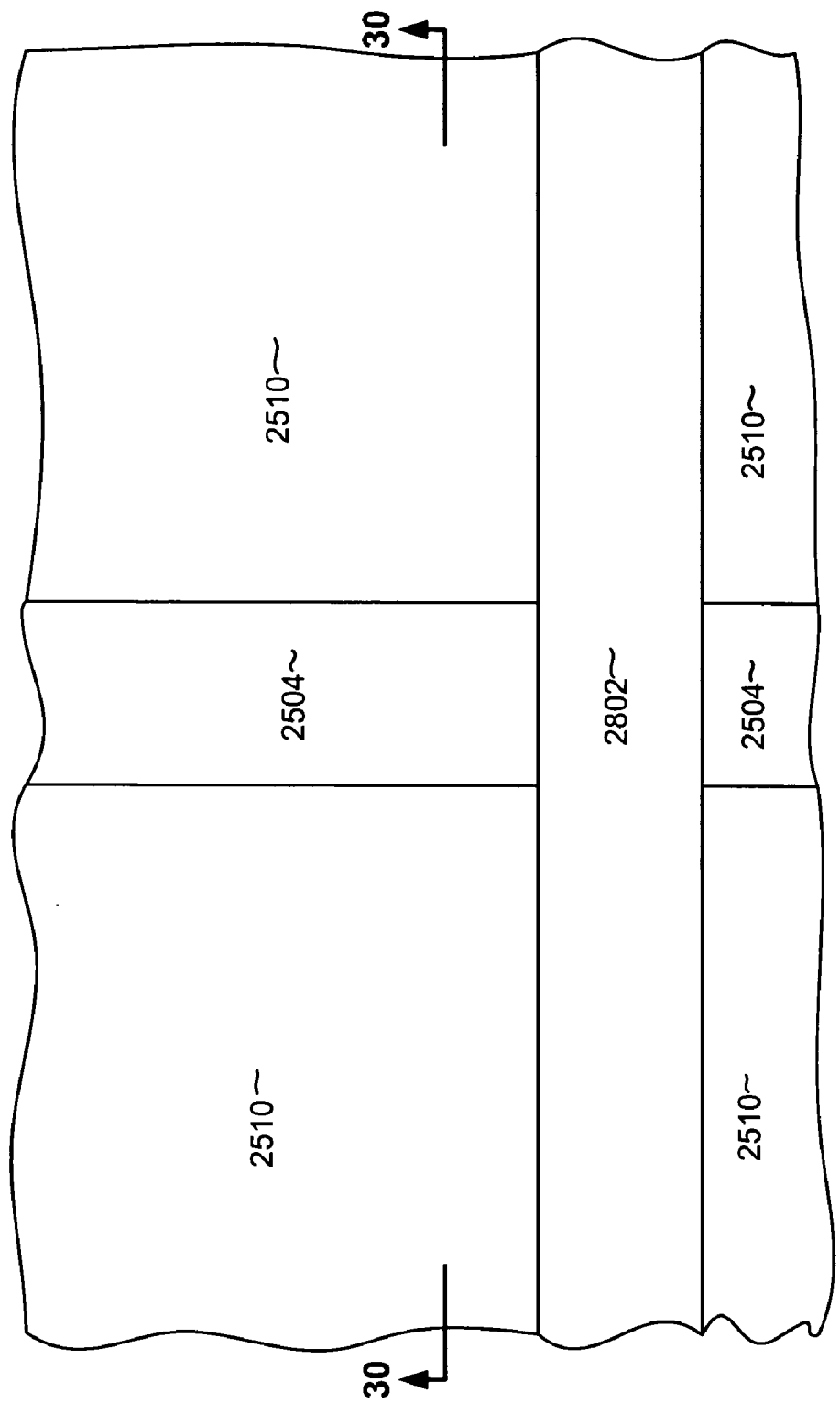
Figure 30:
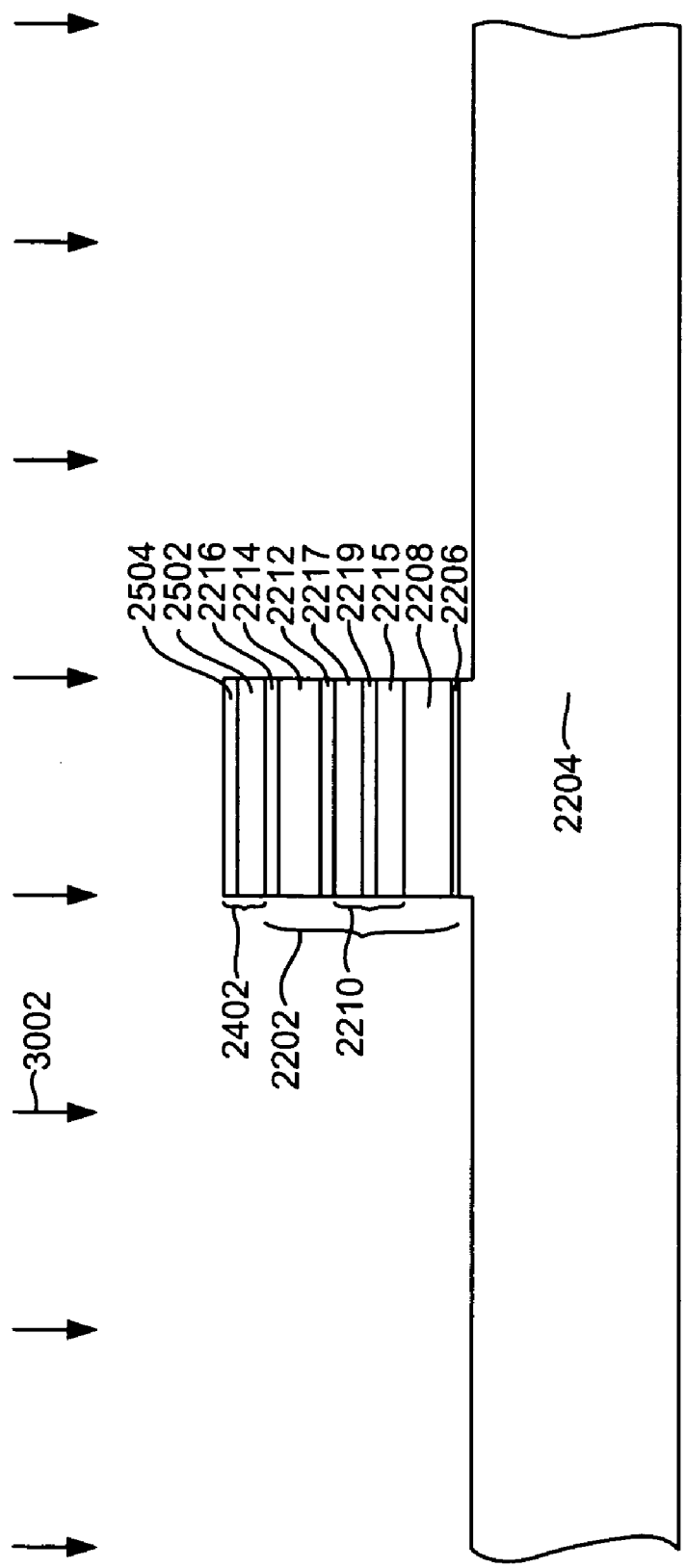

With reference now to FIG. 28, a second stripe height defining mask structure 2802 is formed. The second mask structure can include a hard mask layer 2804, an image transfer layer 2806, and a photoresist layer 2808. The stripe height dimension (SH2) of this mask structure 2802 can be seen with reference to FIG. 29. With reference to FIG. 30 an ion mill 3002 is performed to remove material that is not protected by either of the mask structures (ie. not covered by layer 2504, or 2502 shown in FIG. 29). This ion mill is performed sufficiently to remove the lead layer 2510 and all of the sensor layers in these unprotected regions.

Figure 31:
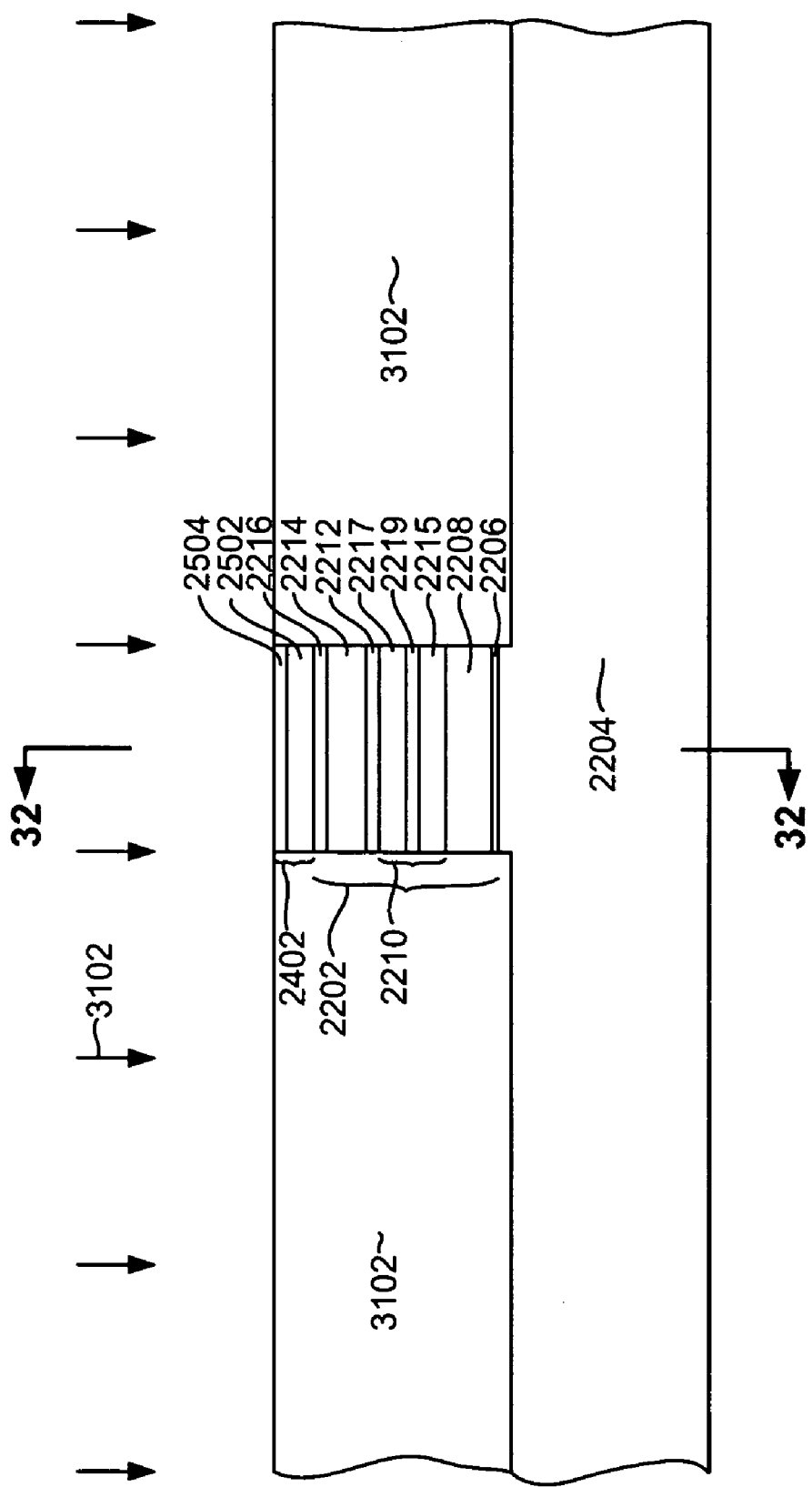
Figure 32:
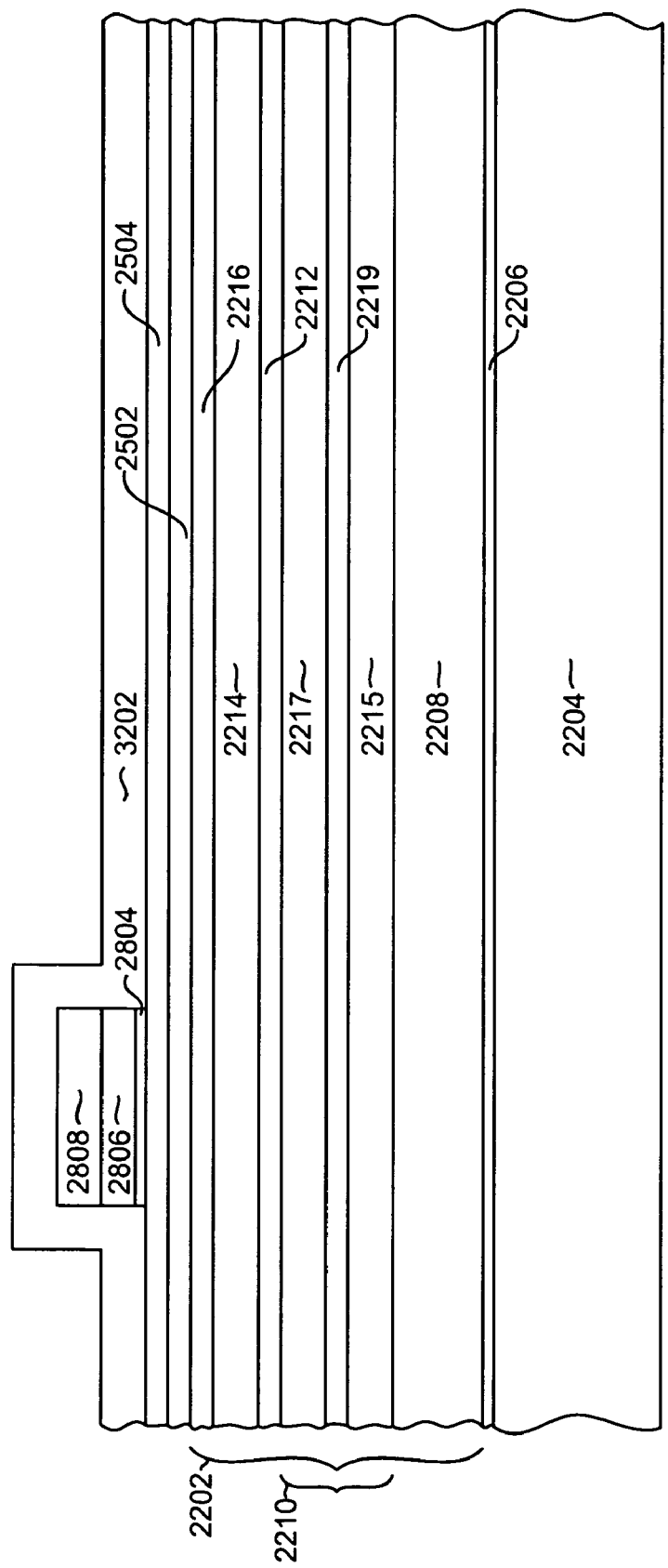

With reference now to FIG. 31, a non-magnetic, electrically insulating fill material 3102 is deposited to fill the regions from which material was removed during the ion mill 3002. A chemical mechanical polish CMP can be performed to planarize the fill material 3102. With reference to FIG. 32, a layer of hard non-magnetic, electrically insulating material 3202 such as alumina is deposited. The layer 3202 is preferably deposited by a conformal deposition method, such as atomic layer deposition (ALD) chemical vapor deposition (CVD) etc. Although other materials could be used, for purposes of simplicity, the layer 3202 will be referred to herein as alumina layer 3202.

Figure 33:
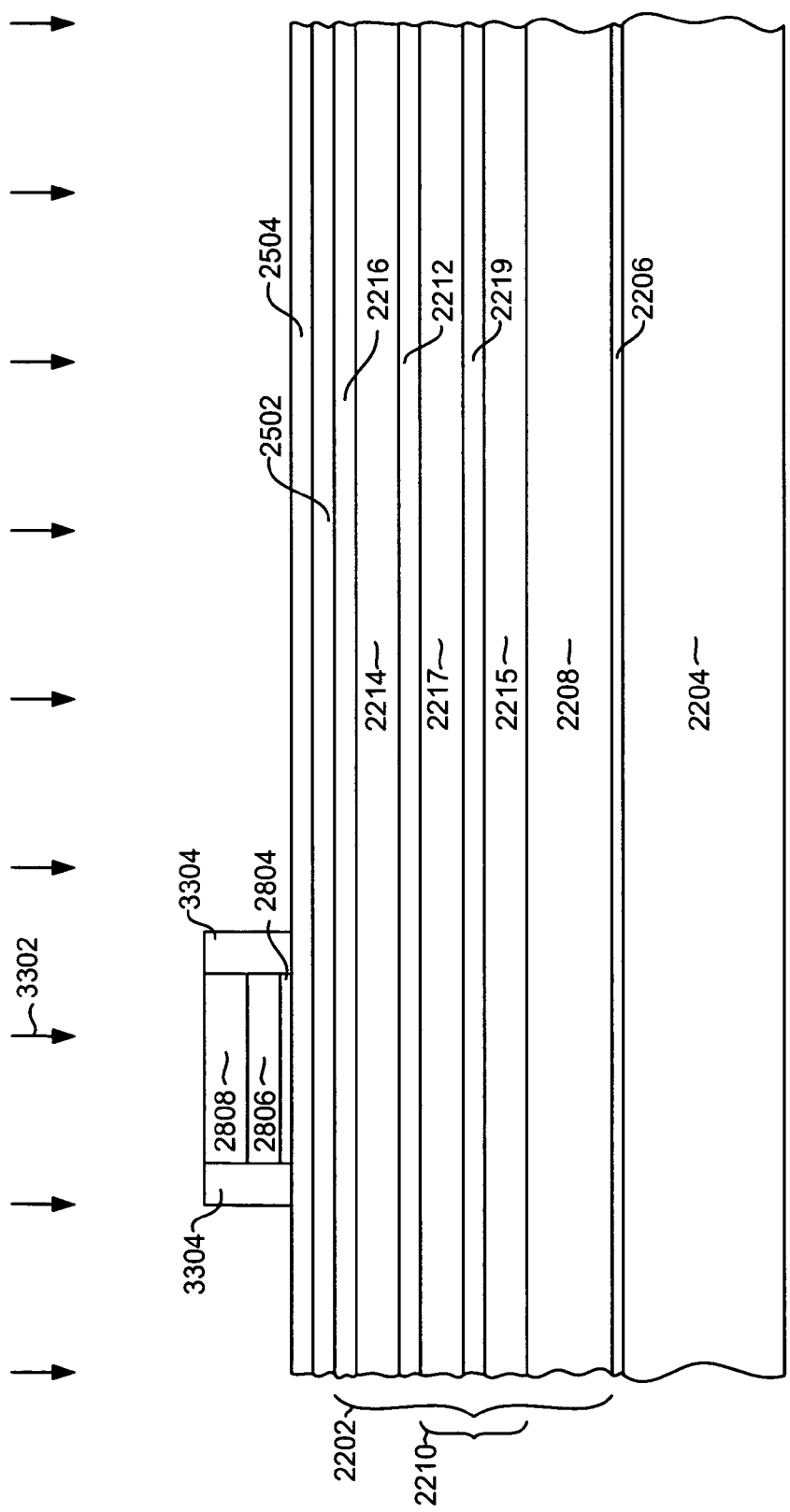
Figure 34:
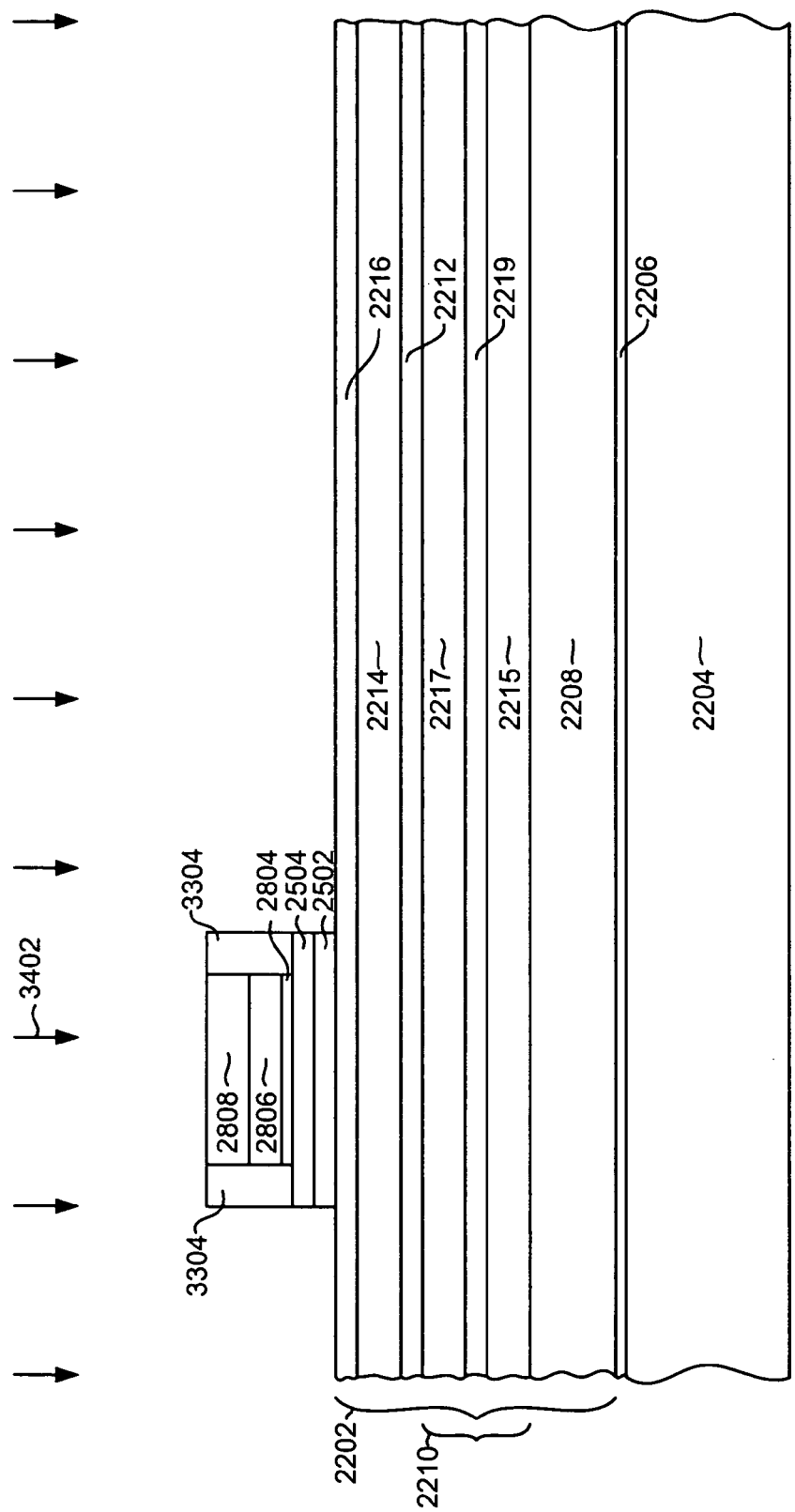
Figure 35:
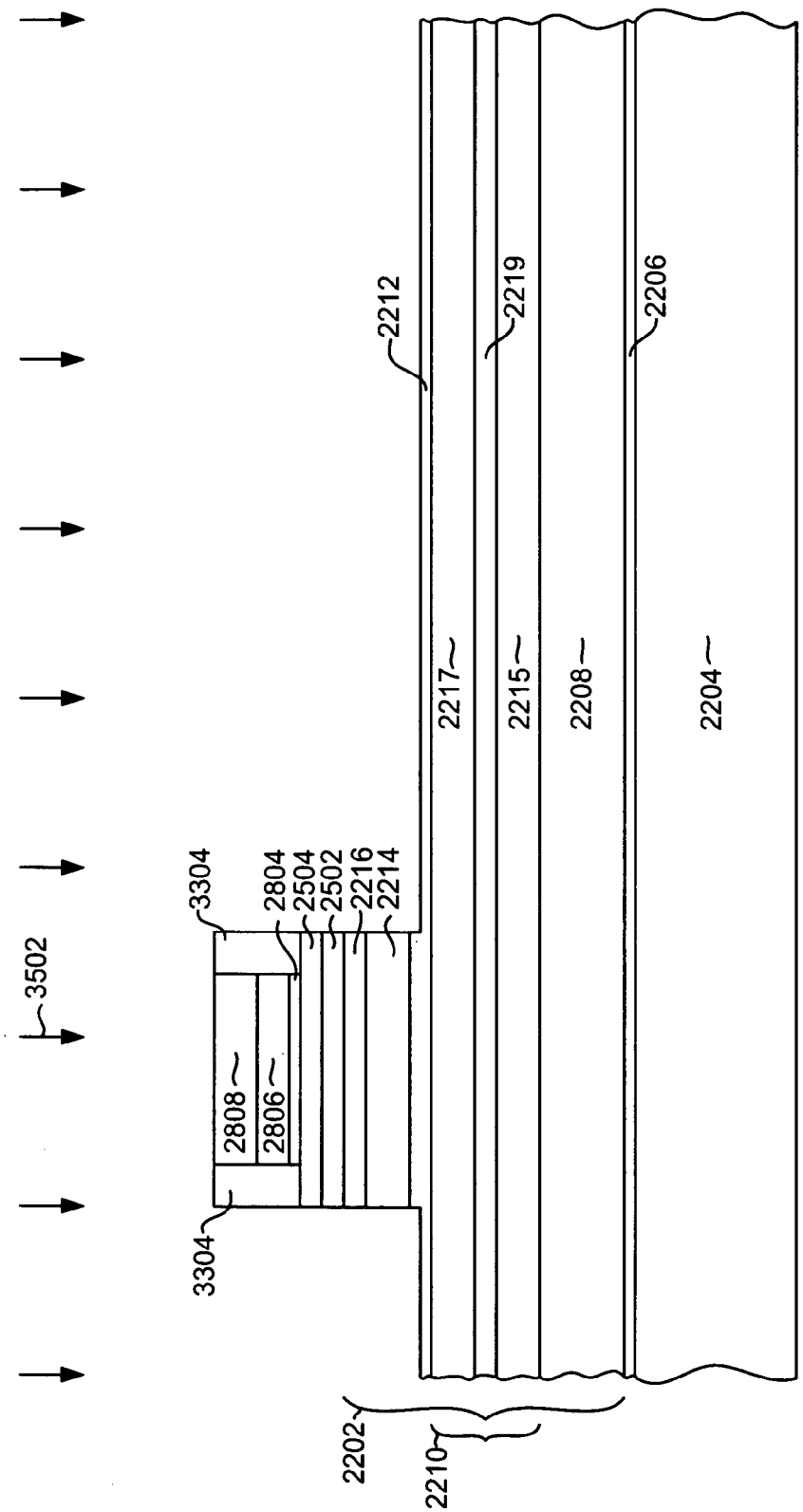

With reference to FIG. 33, an ion mill 3302 is performed to preferentially remove horizontally disposed portions of the alumina layer, leaving alumina side walls 3304. Then, with reference to FIG. 34, a combination of ion mill and reactive ion etch (RIE) 3402 is performed to remove portions of the DLC layer 2502 and Rh layer 2504 that are not protected by the mask 2802 and alumina side walls 3304. Thereafter, as shown in FIG. 35, an ion mill 3502 is performed to remove portions of the capping layer 2216, free layer 2214 and optionally all or a portion of the spacer layer 2212. As can be seen, this leaves the pinned layer extending in the stripe height direction.

Figure 36:
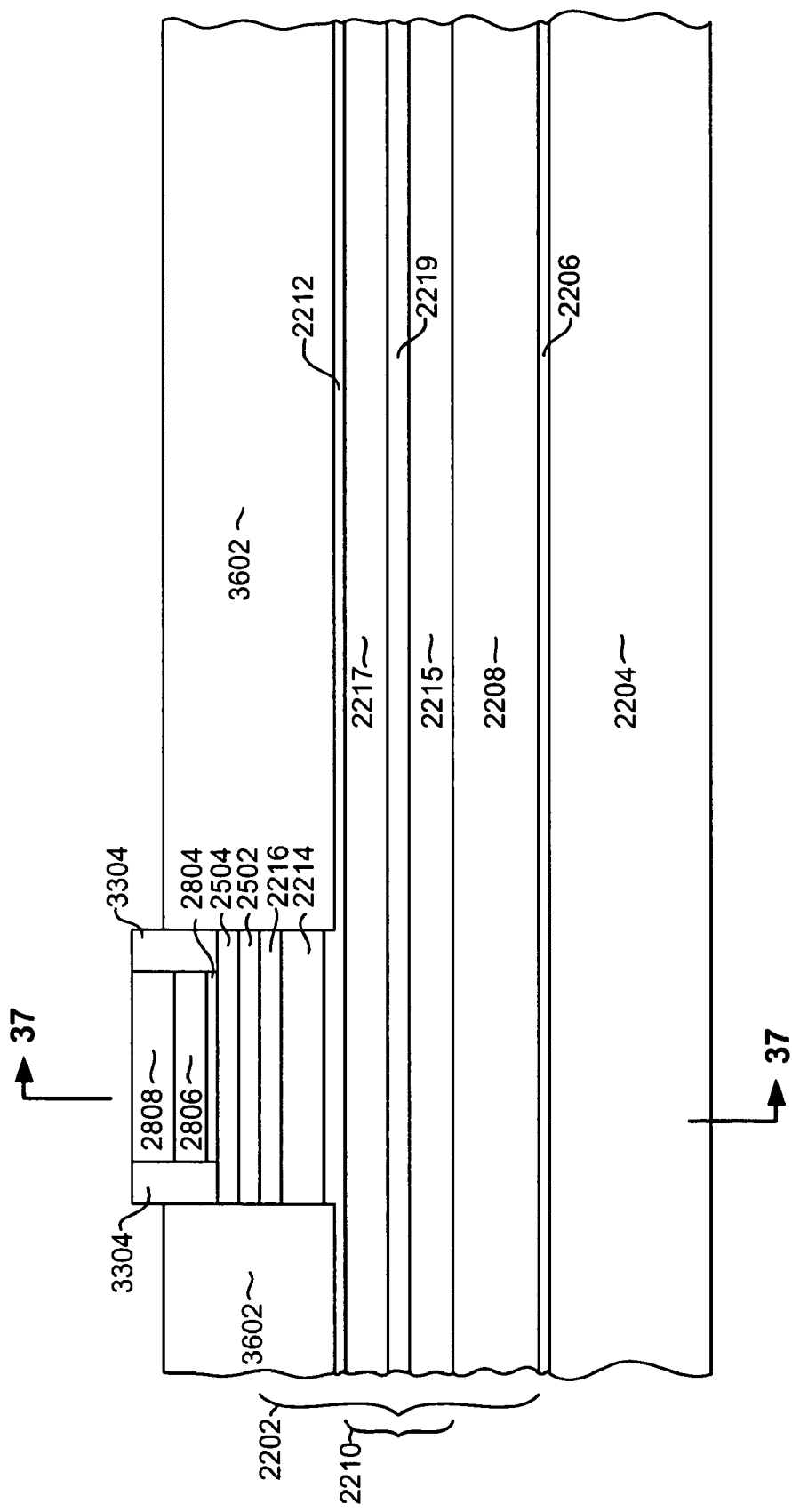
Figure 37:
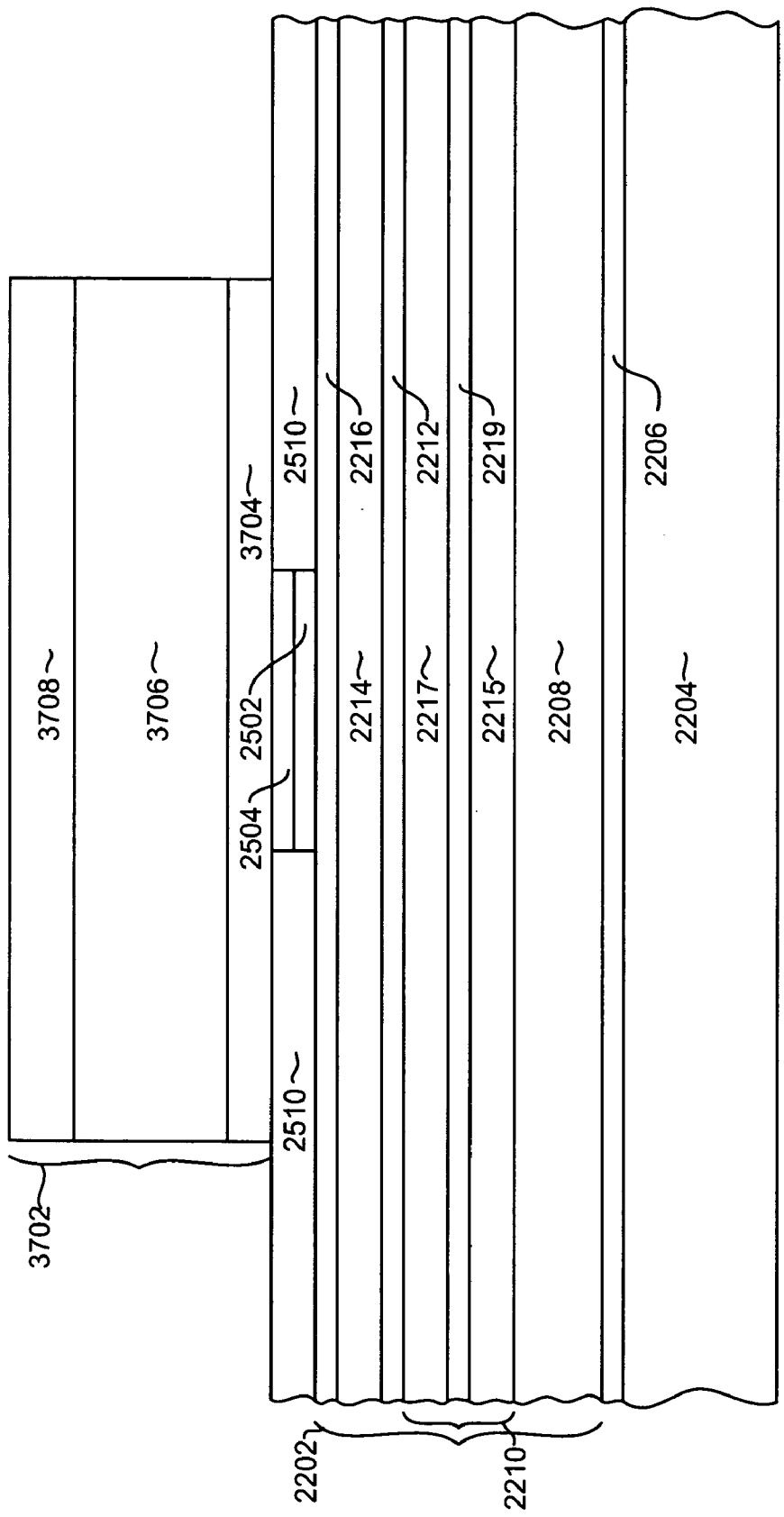
Figure 38:
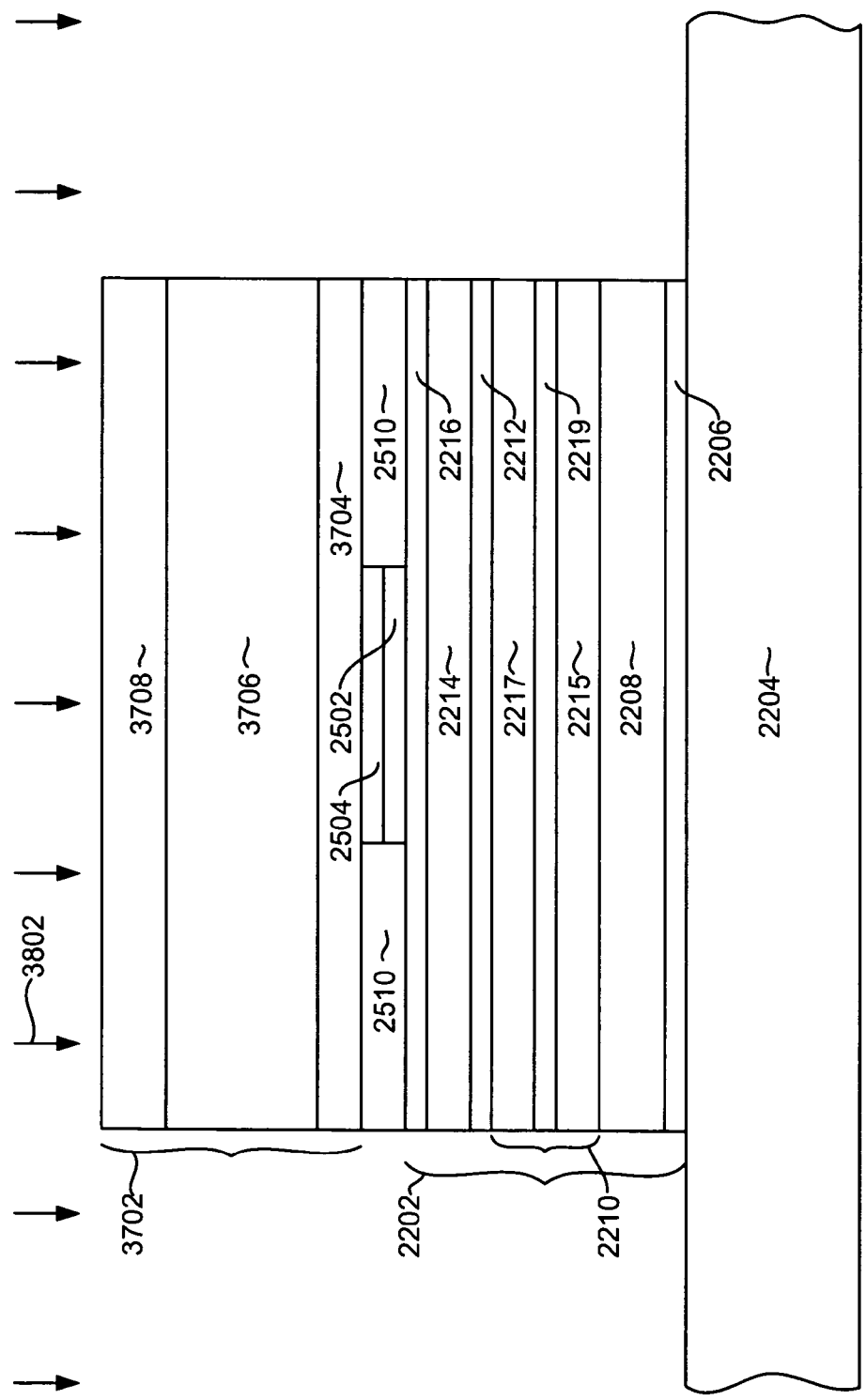

With reference to FIG. 36, a non-magnetic, electrically insulating fill layer 3602 such as alumina is deposited. A chemical mechanical polish can then be performed to planarize the structure. With reference to FIG. 37 a sensor width defining mask 3702 is formed. This mask 3702 may include a hard mask 3704, an image transfer layer 3706 and a photoresist mask 3708. The mask 3702 has a width that is considerably larger than width between the inner edges of the leads 2510. Then, with reference to FIG. 38 an ion mill 3802 is performed to remove lead and sensor material outside of the area protected by the mask 3702. This ion mill 3802 can be performed down to the level of the substrate 2204.

Figure 39:
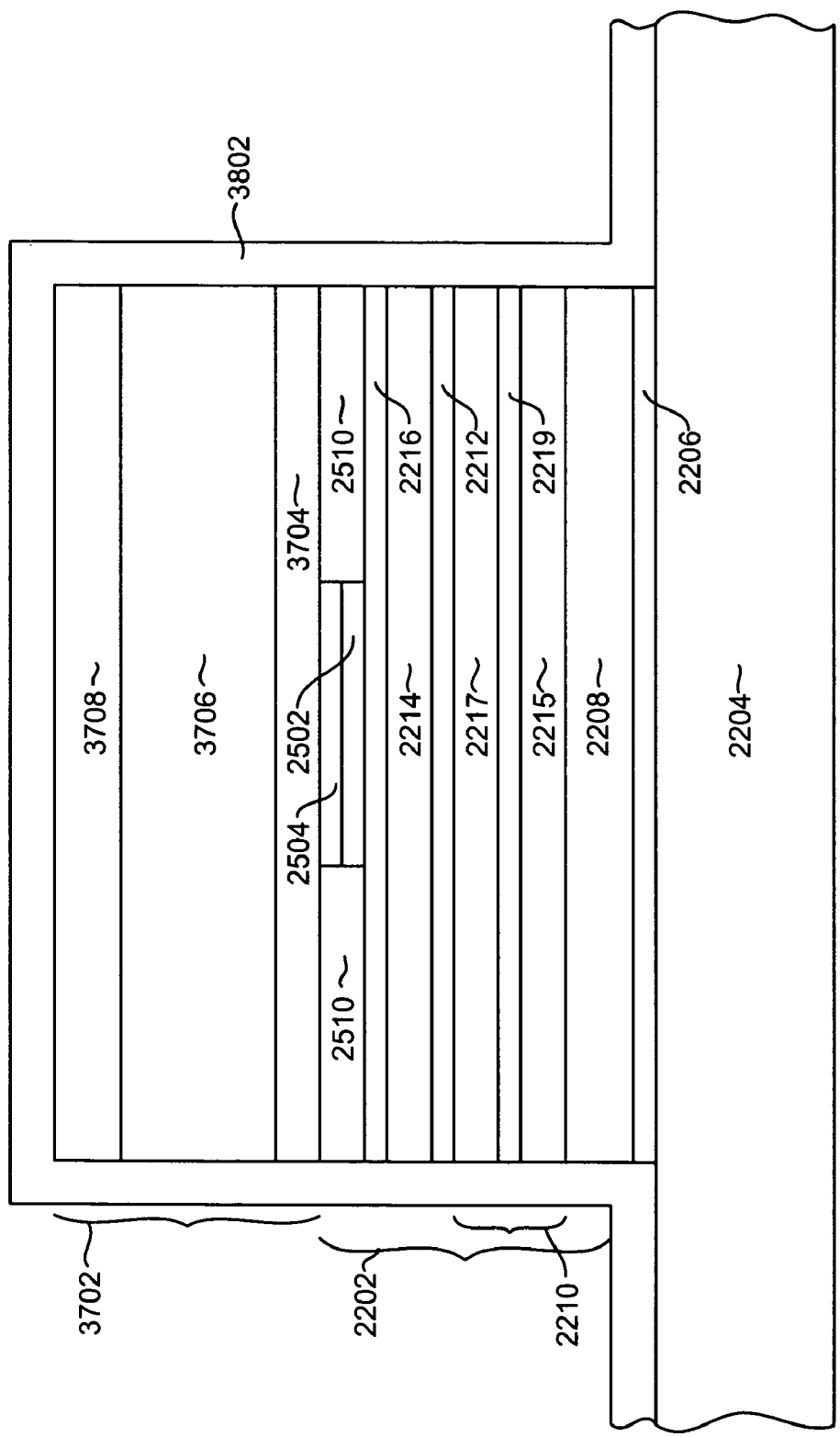
Figure 40:
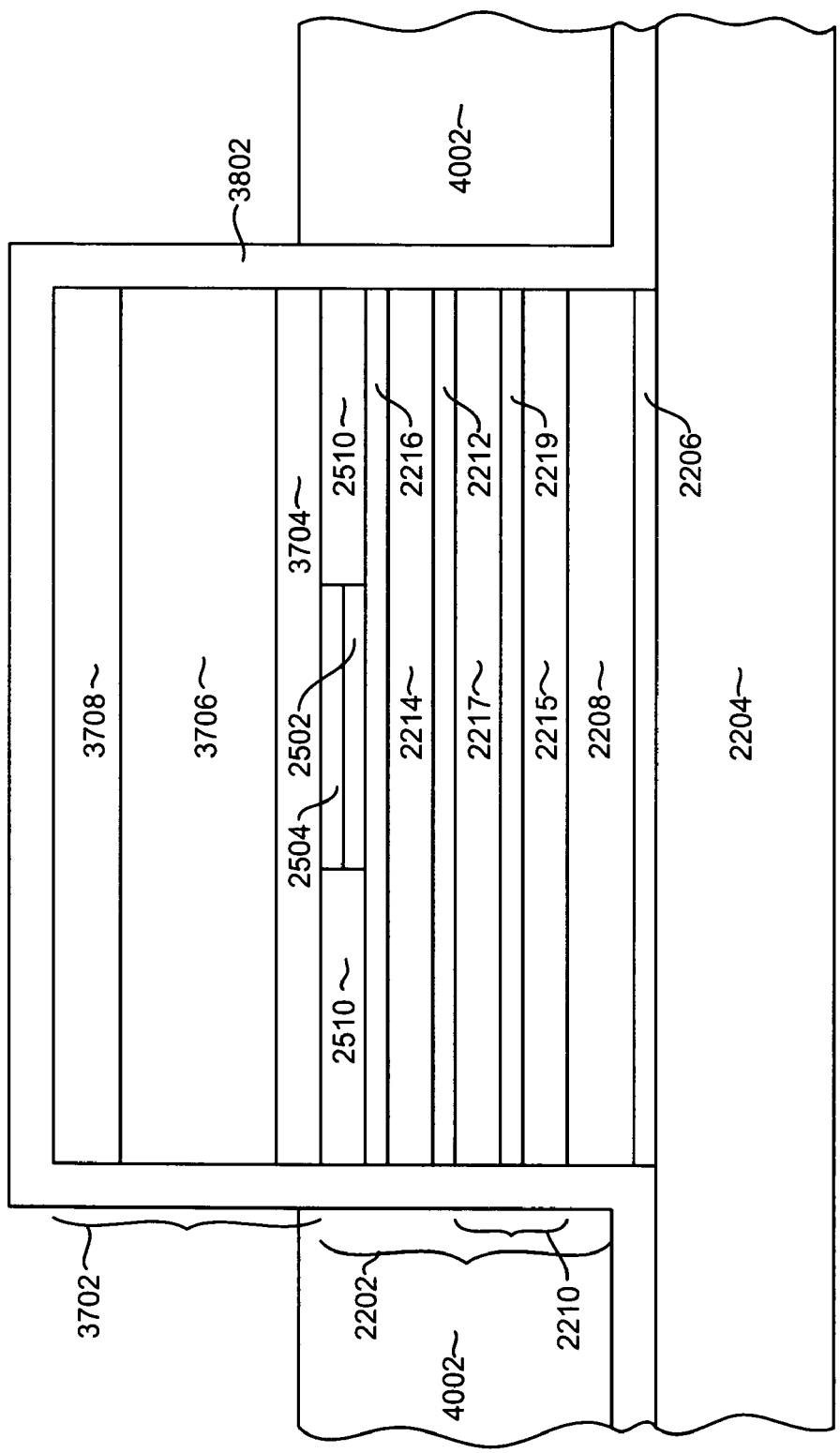

With reference to FIG. 39, a non-magnetic, electrically insulating layer 3802 such as alumina is conformally deposited. The layer 3802 can be conformally deposited by using a process such as atomic layer deposition (ALD), chemical vapor deposition (CVD), etc. Then, with reference to FIG. 40, a layer of hard magnetic bias material 4002 such as CoPt, CoPtCr, etc. is deposited. A chemical mechanical polish (CMP) can then be performed to remove the mask 3702. An ion mill and reactive ion etch process (RIE) can then be performed to remove the remaining Rh and DLC layers 2504, 2502 respectively.

Figure 41:
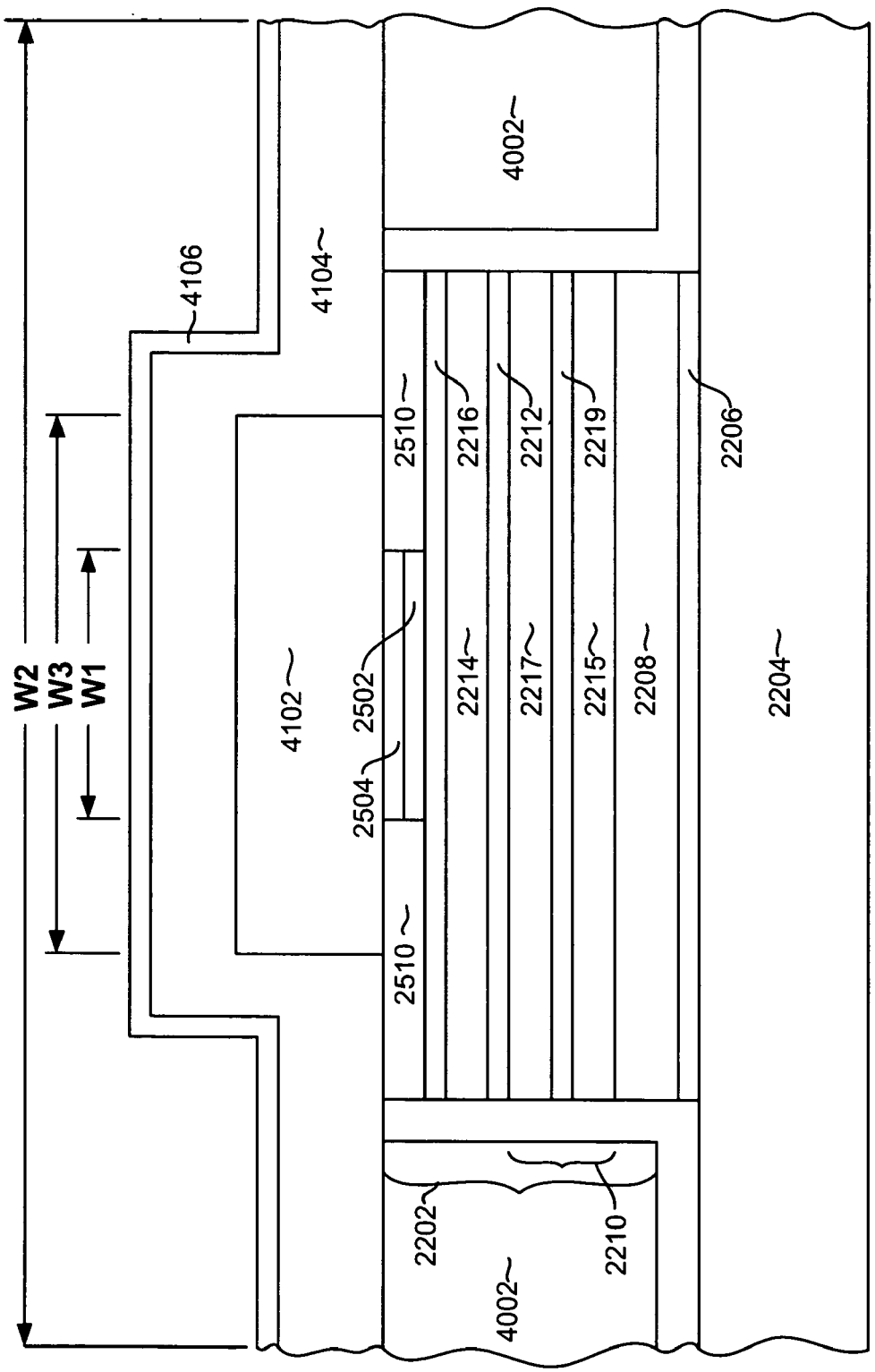
Figure 42:
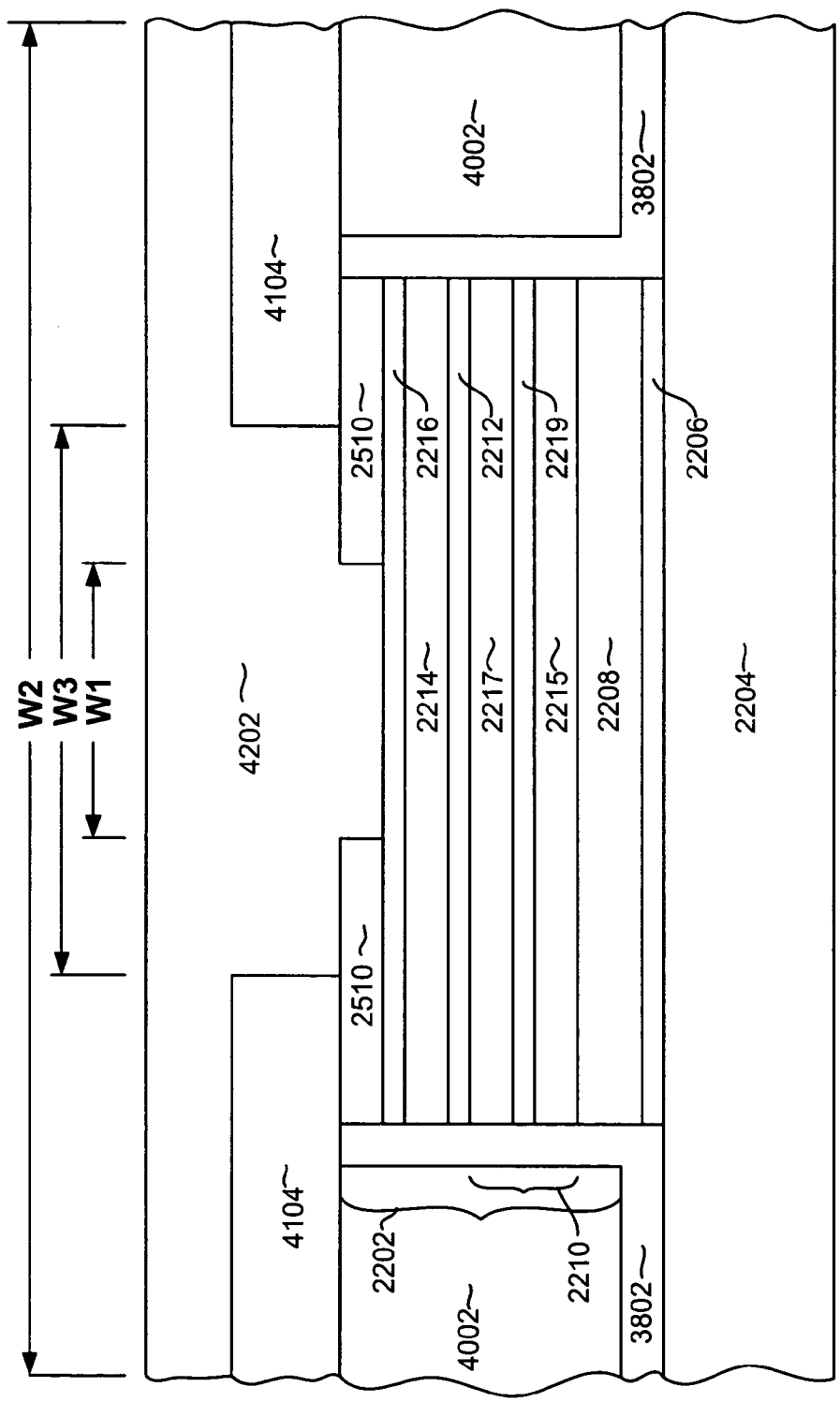

With reference to FIG. 41, another mask layer 4102 is formed having a width (W3) that is larger than the width W1 defined between the inner edges of the lead layers 2510, but smaller than the width W2 of the sensor stack 2202. A layer of electrically conductive material 4104 such as Cu, Rh, Au, etc. A layer of diamond like carbon (DLC) or some other CMP resistant material 4206 can be deposited over the conductive layer 4104. Then, with reference to FIG. 42, a CMP can be performed to planarize the electrically conductive layer 4104 and remove the portions of the conductive layer 4104 disposed over the mask layer 4102. The mask layer 4102 can then be lifted off, and a second non-magnetic, electrically insulating gap layer 4202, such as alumina is deposited.

While various embodiments have been described above, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetoresistive sensor having an air bearing surface (ABS), the sensor comprising:
   a magnetic free layer having a front edge located toward the ABS a back edge opposite the ABS and a lateral side extending from the back edge to the front edge;
   a pinned layer structure having a back edge opposite the ABS, the back edge of the pinned layer extending beyond the back edge of the free layer;
   a non-magnetic, electrically conductive spacer layer sandwiched between the free layer and the pinned layer structure;
   a magnetically hard bias layer extending from the lateral side of the free layer; and
   an electrically conductive lead formed over the hard magnetic layer, the hard magnetic layer and the lead each sharing a common back edge as measured from the ABS;
   wherein the free layer extends beyond the common back edge of the hard bias layer and the lead to form a back flux guide.

2. A magnetoresistive sensor as in claim 1 wherein the pinned layer extends to a first stripe height (SH1) and the free layer extends to a second stripe height SH2, and wherein SH1 is at least twice SH2.

3. A magnetoresistive sensor as in claim 1 wherein the lead and hard magnetic layer share a common front edge that is disposed toward but is recessed from the ABS; and
   the front edge of the free layer extends beyond the front edge of the hard magnetic layer and lead to form a front flux guide.

4. A magnetoresistive sensor as in claim 1 wherein the lead and hard bias layer share a common front edge disposed toward but is recessed from the ABS; and the front edge of the free layer extends to the ABS to form a front flux guide.

5. A magnetoresistive sensor as in claim 1 wherein the lead comprises a first lead layer having an inner edge and a second lead layer formed over the first lead layer, the second lead layer having an inner edge that is disposed further laterally outward than the inner edge of the first lead layer.

* * * * *